(12) United States Patent
Douer

(10) Patent No.: US 12,318,033 B2
(45) Date of Patent: Jun. 3, 2025

(54) NITRO/COLD BREW AUTOMATED ROBOTIC KIOSK WITH CONTACTLESS TECHNOLOGY

(71) Applicant: Morris Douer, Monsey, NY (US)

(72) Inventor: Morris Douer, Monsey, NY (US)

(73) Assignee: Morris Douer, Monsey, NY (US)

( * ) Notice: Subject to any disclaimer, the term of this patent is extended or adjusted under 35 U.S.C. 154(b) by 826 days.

(21) Appl. No.: 17/300,607

(22) Filed: Sep. 1, 2021

(65) Prior Publication Data

US 2023/0067440 A1    Mar. 2, 2023

Related U.S. Application Data

(60) Provisional application No. 63/221,757, filed on Jul. 14, 2021, provisional application No. 63/073,334, filed on Sep. 1, 2020.

(51) Int. Cl.

| | |
|---|---|
| *A47J 31/52* | (2006.01) |
| *A47J 31/41* | (2006.01) |
| *A47J 31/46* | (2006.01) |
| *A47J 31/60* | (2006.01) |
| *B01F 23/237* | (2022.01) |
| *B01F 101/14* | (2022.01) |

(52) U.S. Cl.
CPC ............... *A47J 31/52* (2013.01); *A47J 31/41* (2013.01); *A47J 31/461* (2018.08); *A47J 31/468* (2018.08); *A47J 31/605* (2013.01); *B01F 23/23765* (2022.01); *B01F 2101/14* (2022.01)

(58) Field of Classification Search
CPC ........ A47J 31/52; A47J 31/461; A47J 31/468; A47J 31/41; A47J 31/605; B01F 23/23765; B01F 2101/14
See application file for complete search history.

(56) References Cited

U.S. PATENT DOCUMENTS

| | | | |
|---|---|---|---|
| 2014/0154382 A1* | 6/2014 | Green | B67D 1/008 426/477 |
| 2017/0297888 A1* | 10/2017 | Kleinrichert | B67D 1/004 |
| 2018/0042258 A1* | 2/2018 | Roberts | A47J 31/0615 |
| 2018/0236417 A1* | 8/2018 | Wilburn Borders | B01F 25/105 |
| 2018/0289203 A1* | 10/2018 | Piedrabuena | A47J 31/41 |
| 2018/0327247 A1* | 11/2018 | Newton | B67D 1/1204 |

(Continued)

*Primary Examiner* — Jeffrey T Carley
*Assistant Examiner* — Keith Brian Assante

(57) ABSTRACT

A system for preparing and dispensing a nitrogen-infused beverage includes a chilled water delivery subsystem, a beverage concentrate subsystem including a beverage concentrate fluidically coupled to a beverage pump, and a nitrogen delivery subsystem. The system includes a nitrogen infuser having a first input fluidically coupled to the nitrogen delivery subsystem and one other input fluidically coupled to the beverage pump. A flavor concentrate subsystem includes a flavor concentrate fluidically coupled to a flavor pump. The system also includes a kegerator tower assembly, and a flavor manifold having a first input fluidically coupled to an output of the nitrogen infuser, one other input to the at least one flavor pump, and an output fluidically coupled to an input of the kegerator tower assembly. A controller controls the beverage pump and the flavor pump. A computer coupled to a camera, and configured for instructing the controller to prepare the beverage.

14 Claims, 27 Drawing Sheets

(56) References Cited

U.S. PATENT DOCUMENTS

| | | | |
|---|---|---|---|
| 2020/0085232 A1* | 3/2020 | Pi | A47J 31/3628 |
| 2020/0138231 A1* | 5/2020 | Teo | A23F 5/262 |
| 2020/0361758 A1* | 11/2020 | Fantappi | B67D 1/0859 |
| 2021/0069655 A1* | 3/2021 | Patel | B01F 23/2362 |
| 2021/0206617 A1* | 7/2021 | Maharaj | B67D 1/10 |
| 2021/0267410 A1* | 9/2021 | Buerger | A23F 5/26 |
| 2021/0393072 A1* | 12/2021 | Capobianco | A47J 31/41 |
| 2022/0262190 A1* | 8/2022 | Nakao | A47J 31/4403 |

* cited by examiner

NITRO/COLD BREW AUTOMATED ROBOTIC KIOSK WITH CONTACTLESS TECHNOLOGY

CROSS REFERENCE TO RELATED APPLICATIONS

This application claims priority under 35 U.S.C § 119 (e) to U.S. Provisional Patent Application No. 63/221,757, entitled "Nitro/Cold Brew Automated Robotic Kiosk with Touch less Technology and Smart AC/DC system" and filed on Jul. 14, 2021, and to U.S. Provisional Patent Application No. 63/073,334, entitled "Nitro Brew Automated Robotic Kiosk with Touch-less Technology" and filed on Sep. 1, 2020. Each of these two provisional patent references is hereby incorporated by reference in its entirety herein.

This application is also related to U.S. Pat. No. 11,102,992, entitled "Universal, Refrigerated, Automated Vending Kiosk for Interchangeable Equipment Serving Soft Serve Ice Cream and Frozen Beverages" and issuing on Aug. 21, 2021, and U.S. Pat. No. 10,211,671, entitled "Auxiliary A/C Power Supply for Vending Machines" and issuing on Feb. 19, 2019. Each of these two patents is hereby incorporated by reference in its entirety herein.

FIELD OF THE INVENTION

This disclosure relates generally to automated vending machines and kiosks and more particularly relates to automated vending machines and kiosks that are configured to dispense one or more chilled Nitro Brew, Cold Brew, KOMBUCHA, or Tea, with a Flavoring system as well as Touch Screen driven and Phone App driven in a compact foot print with minimal contact between the customer and the equipment preparing the beverage.

BACKGROUND OF THE INVENTION

Prior Art For Dispensing Nitro/Cold Brew Drinks are mainly in the category of self serve non automatic & complete contact between the customer and the equipment. In such category each Nitro/Cold brew flavor is packaged separately in a keg or Bag N Box and is dispensed through a separate dedicated Tap, thus requiring large dedicated areas in case of multiple flavor choices. Other flavor options involve self tap squirt flavor bottles which are available for the customer to tap & squirt a flavor in his Nitro Cup. The Problem with that system is lack of distribution of the flavor in the cup thus requiring multiple squirts which sum up to a high calorie content and a none uniform flavor in the drink. Standard Nitro Dispensing equipment such as mentioned is manufactured by companies like Bunn Co. with a product commercially known as NITRON; In this unit Nitrogen is constantly produced with a Nitrogen generator. Prior Art for Nitro Infused Beverage are known. U.S. Pat. No. 9,623,383 to Kleinrichert, which is hereby incorporated by reference in its entirety herein, discloses a system and method to prepare and dispense a Nitrogen infused beverage. Companies such as AC Beverage of Annapolis MD & Micro Matic Inc. with a product commercially known as "Joe tap" have adopted the Kleinrichert system and commercialized it. The equipment is manually driven and lacks the proper monitoring of product depletion, as well as a lack of monitoring of the system operating performance, which at times results in a poor quality output and a non consistent beverage to the consumer. These set ups also require dedicated taps for each individual product/flavor.

The prior art sited which follow the vending machine criteria for dispensing Nitro Brew is known as "Commonwealth Joe" Nitro Brew Vending Machines. These small in size and low amperage machines are none automatic and require the customer to introduce his cup and dispense the beverage using a manual Tap Handle. The Machines are considered Vending since they incorporate a Vending payment system, as well as Data-driven automated recording of the Tap dispensing quantity. These machines provide a maximum of 2 tap choices and product is stored in Pressurized Kegs. The Unit also works with a Nitrogen Tank for the supply of N2.

Other Prior Art Vending Machines for Dispensing Nitro Coffee and other high end coffee drinks typically have power and space requirements that exceed the power and space available to more conventional food and beverage vending machines. Since real estate is generally, limited, smaller machines are desirable. Available power is often limited to a standard 110 Volts 15 Amp service, which fails to meet the current requirement for most prior art machines.

Maintenance of prior art vending machines has proven to be costly, and reduce profit margins. Operators wish to avoid frequent visits and cumbersome, labor intensive sanitation requirements. Repairs should be accomplished quickly and without substantial disassembly of the machines. In the current state of the art, more advanced kiosk-style machines by manufacturers such as Café X Technologies "Cafex" incorporate a robotic Arm to serve and prepare Coffee drinks, "Rozum Café" & "BaristaBot" by Briggo are all Kiosks requiring an average of 27 Square Feet of real estate. The Kiosks Are very large in size, almost the size of small coffee shops, extremely expensive, and require electric service rated much higher than 120 Volts 20 Amps, or 220 Volts. The actual beverage equipment and Raw product in the Kiosks requires attention by an operator No different than a coffee shop.

Therefore, there remains a need for a method and a system to prepare and dispense nitrogen and non nitrogen infused beverages and a Nitro Flavoring system in a contactless fashion with smarter Equipment which will provide the customer with a wide range of options and flavors which he may be able to select through a phone App with a minimal foot Print and minimal power consumption, as well as inform the machine operator remotely on the entire operating status of the equipment through a dedicated server and an operating app.

SUMMARY OF THE INVENTION

Aspects of the present disclosure are directed to a vending machine or Kiosk for automatic dispensing of Nitro Brew, cold Brew, and Lattes with multiple flavor options which are properly infused and balanced into the final product with minimal flavoring Usage and maximum Calorie reduction. As well as the possibility of Hot Beverage, all from Liquid Concentrates in the Bag N Box which are mixed with triple filtered water and Nitrogen with one way quick connect valves; thus minimizing surface contamination by the machine operator. In contrast to prior art, the disclosed vending machine Kiosk is configured with a foot print and power requirements that are well within the boundaries available for conventional food and beverage vending machines as well as minimal surface contact between the customer and the equipment preparing the beverage. The invention incorporates sanitary measures which are designed to minimize surface contact between the customer and the equipment preparing his beverage due to the Covid- 19 pandemic complications, which also include Bacteria and Virus killing measures utilizing UVC Light in strategic areas as well as an automatic delivery tray which extends beyond the boundary of the machine and serves the customer with the final product. In addition the Invention also incorporates a QR reader on Board which allows the customer to select, build his product and purchase with his/her Cell phone without actually touching the machine. The Invention also incorporates a Smart AC Relay system which guarantees the Nitro Maker operation as an integral component as well capable of turning the entire Kiosk to Battery operated instantly for long durations when Grid power is down since the entire Vending Kiosk has a power consumption of only 2.5 Amps at 110 Volts.

BRIEF DESCRIPTION OF THE DRAWINGS

A more complete understanding of the present disclosure may be realized by reference to the accompanying drawing in which.

DETAILED DESCRIPTION OF THE INVENTION

The following merely illustrates the principles of the disclosure. It will thus be appreciated that those skilled in the art will be able to device various arrangements which, although not explicitly described or shown herein, embody the principles of the disclosure and are included within its spirit and scope. Furthermore, all examples and conditional language recited herein are principally intended expressly to be only for pedagogical purposes to aid the reader in understanding the principles of the disclosure and concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1:
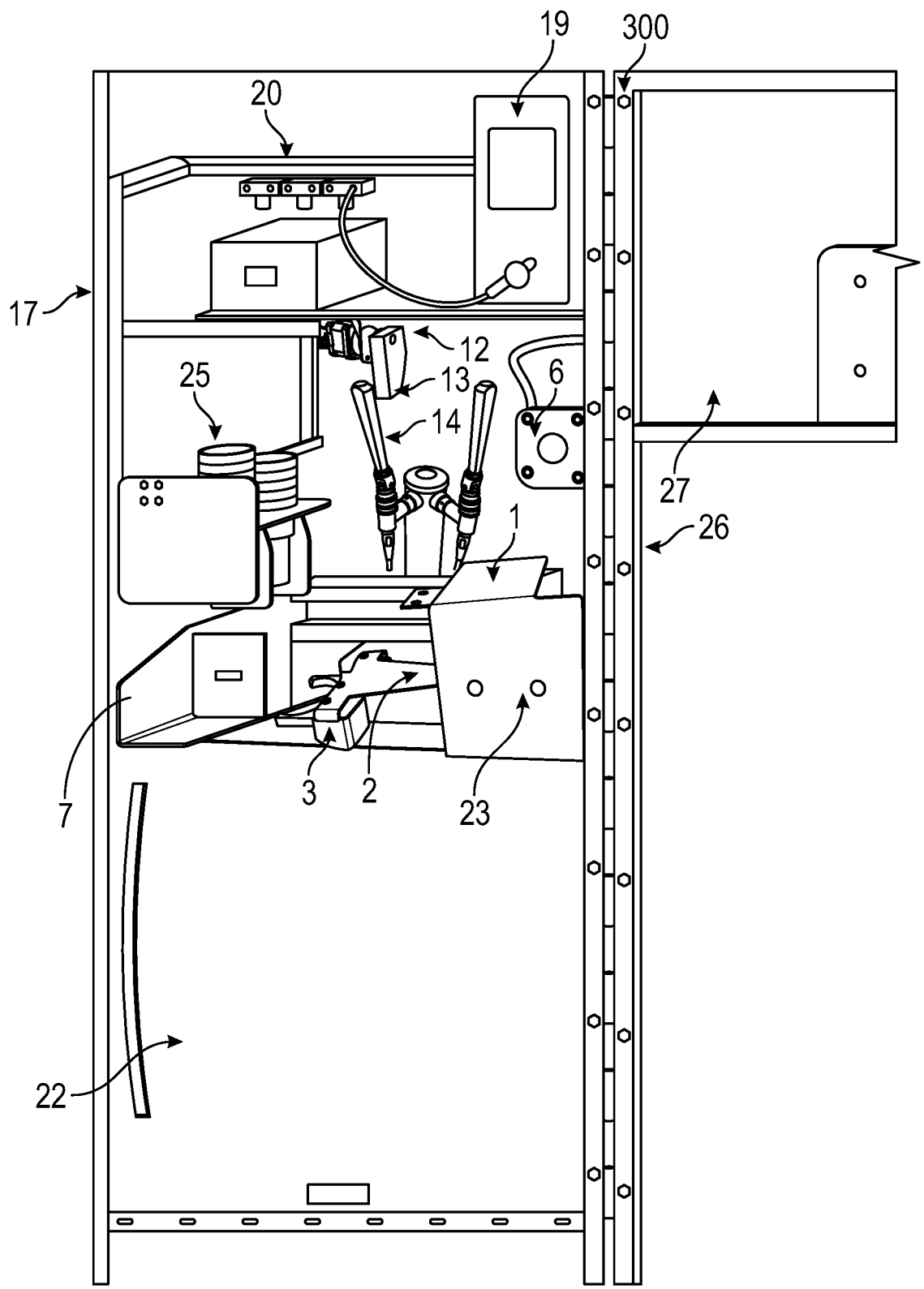
FIG. 1 provides a perspective diagram depicting a front inside view of the first embodiment of the automated vending kiosk invention in accordance with aspects of the present disclosure.

FIG. 1 illustrates a frontal look of the inside of the Nitro Beverage Vending Kiosk. The Machine is made of aluminum extrusions (17) such as available from 80/20 Inc. of Columbia City, Indiana. Such frame may be altered with Minimal costs and parts to accommodate custom needs in the vending/food service business, and without affecting the rest of the structure. The Lower portion of the machine utilizes an off the shelf Kegerator refrigerated unit (22), in which Bag N Box concentrates are stored as well as Chilled water reservoirs further explained and illustrated in (FIG. 11). The present invention utilizes a computer a VMC vending machine controller, a network of motor and relay microprocessors, several modular Linear components, motors, actuators, and relays in order to automate the Nitro Infused Beverage process and offer the customer a hands free experience where the kiosk does it all.

Figure 2:
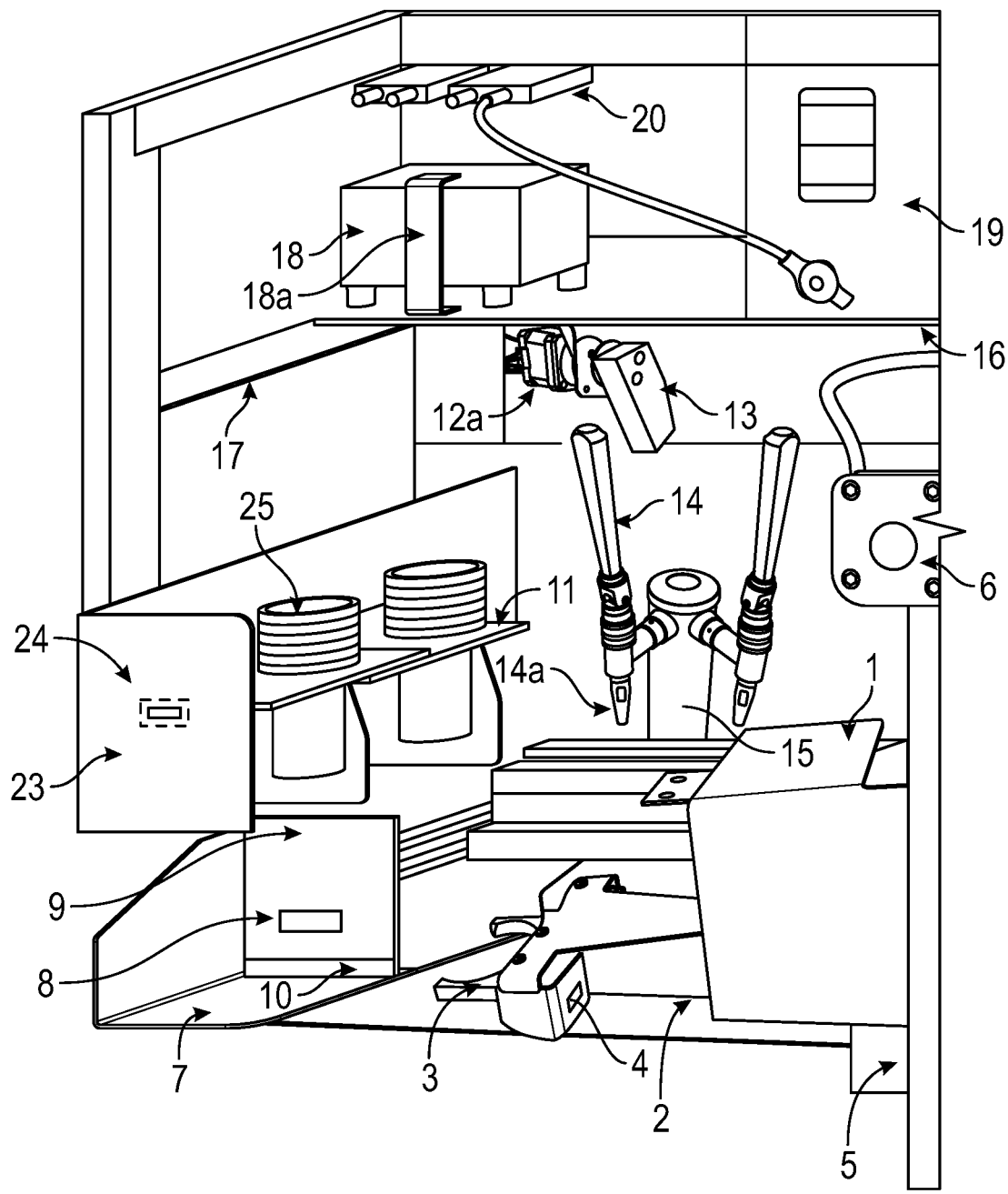
FIG. 2 provides another schematic diagram depicting a closer inside view of the first embodiment of the automated vending Kiosk Invention.
Figure 3:
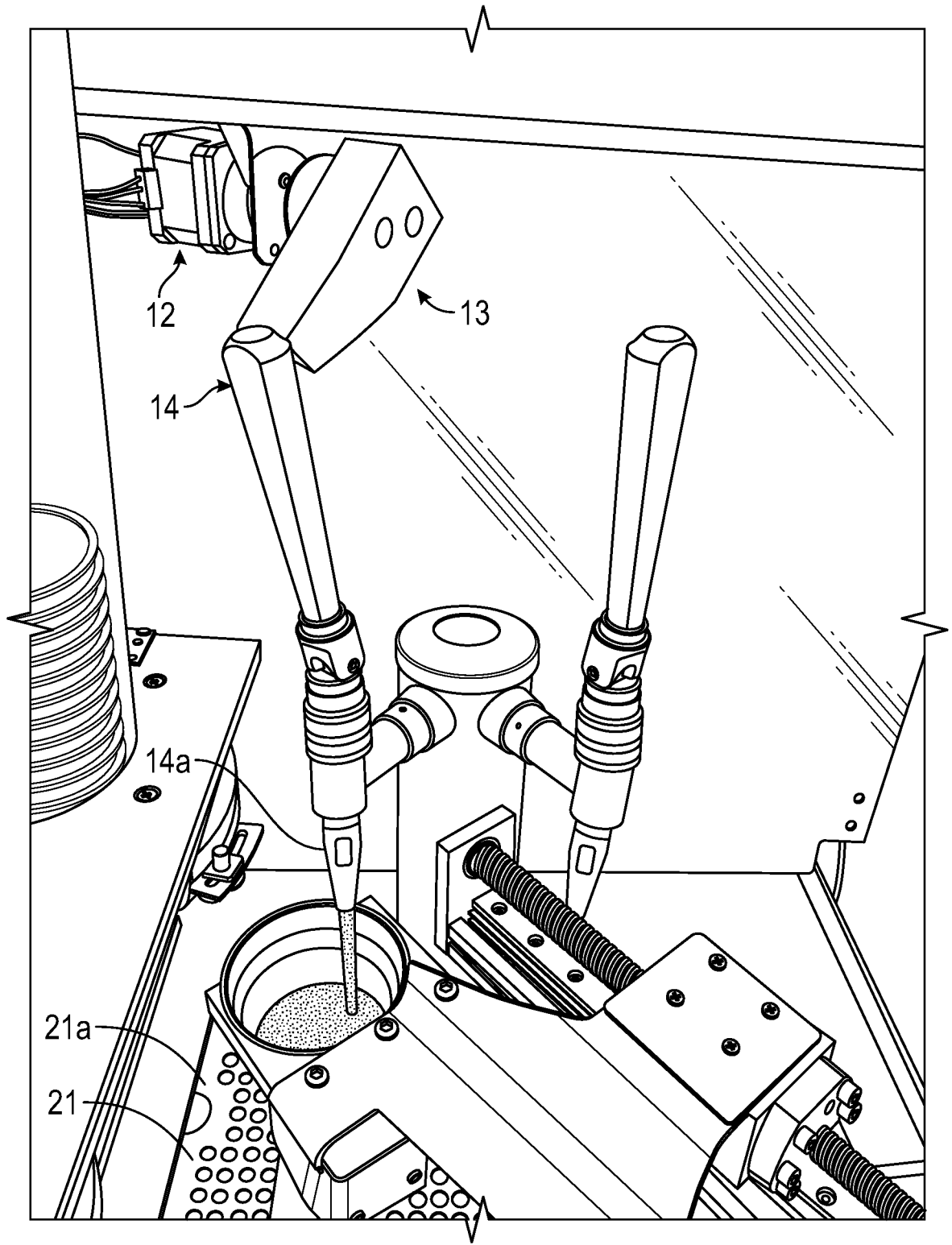
FIG. 3 provides a schematic diagram depicting a closer view of the Automatic Beverage dispensing Lever Pusher in a Beverage Pouring position inside the first embodiment of automated vending Kiosk.
Figure 11A:
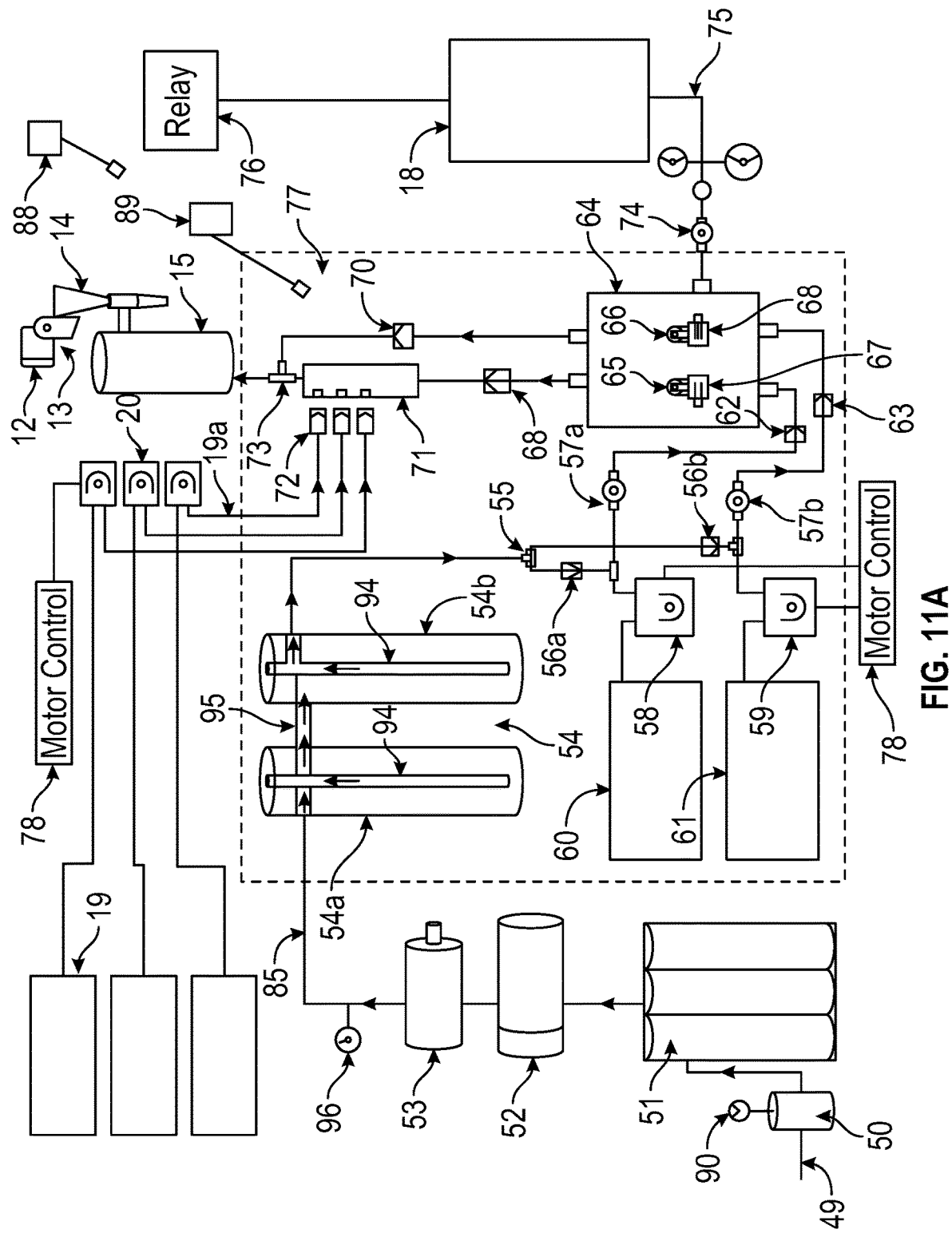
FIG. 11A provides a schematic diagram showing the entire Nitro & flavoring System of the present invention including Water Flow, Bag in Box beverage concentrate, nitrogen infusing system of the invention, a Curtis Nitrogen Beverage infuser made by Wilbur Curtis Co. Product and "Nitron" gas Module made by Bunn Corporation product.
Figure 11B:
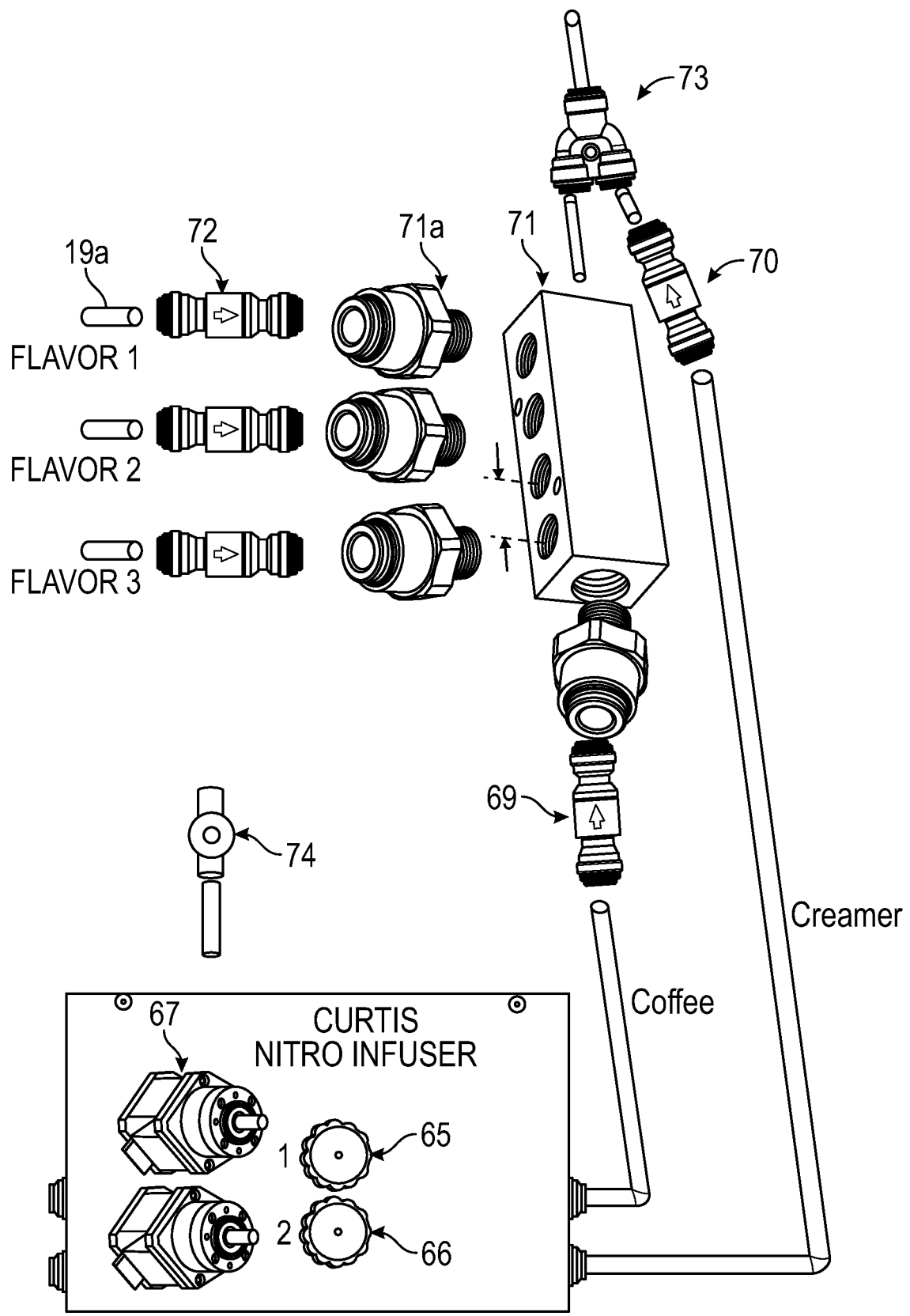
FIG. 11B provides a schematic diagram showing the Bag in Box beverage Flavoring concentrate system and nitrogen infusion in a close up.
Figure 15:
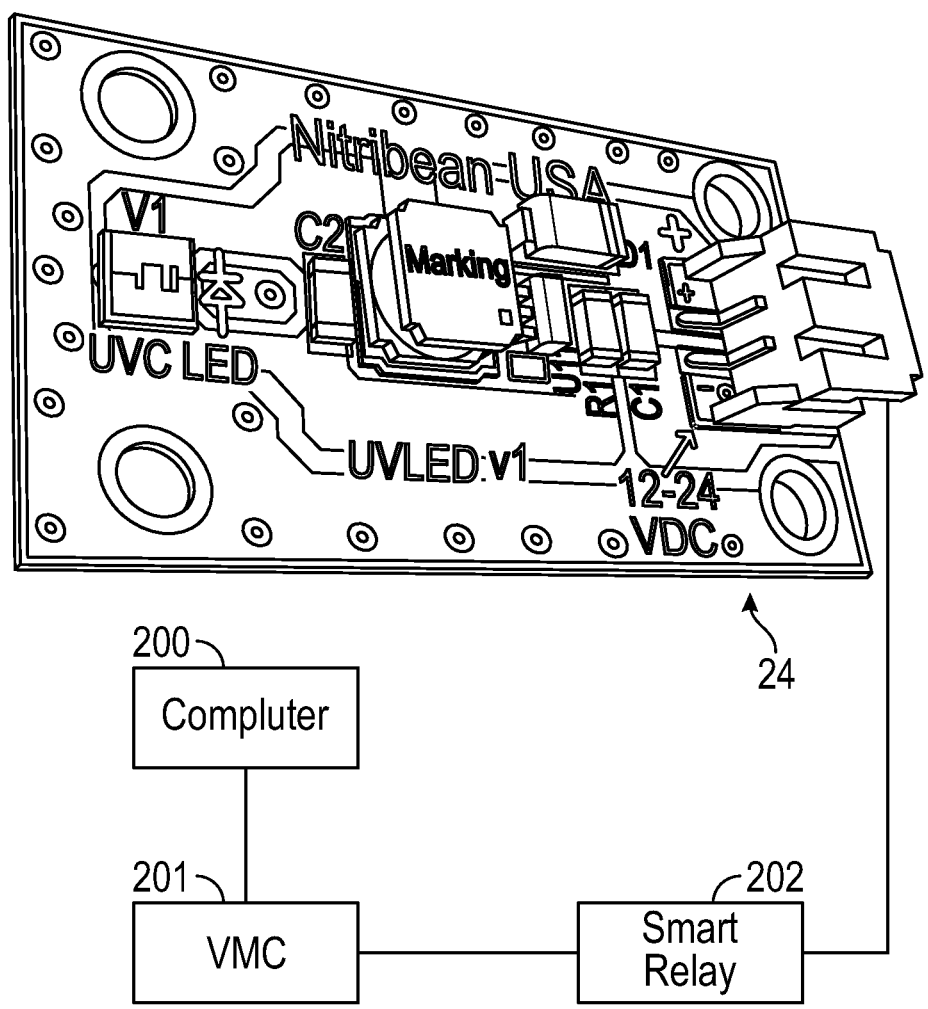
FIG. 15 illustrates a schematic diagram of a UVC control Card (24) for emitting a disinfecting UVC light onto the Cup delivery Tray and a smart Relay control system.

FIG. 2 provides a frontal view of the upper & mechanical section of the automated Vending Nitro Kiosk. A Motorized linear Actuator (6) is mounted on the right side of the structural frame which provides the Up & Down Movements of the Linear Robotic Arm (1). Forward and backward movements are made by a structural Travel bracket (2) which travels alongside a linear track with precise stops which are provided by a stepper motor. Cup Cradle (3) for cup retrieval & transport is attached to Travel Bracket (2) and Infrared or ultrasonic sensor (4) assures the presence of a cup within the delivery cycle. Linear Arm (1) is back centered on a Pillow Block Ball Bearing system (5) controlled by a Stepper Motor and timing belt for precise right & Left Movements. In the left side of the machine there is a Dual stack Cup Dispenser (11) which may dispense 2 different size cups (25). Underneath the cup Dispenser situates a delivery Tray (7) upon which the final Product is served to the customer. Tray (7) protrudes outside of the machine's door frame in its delivery mode. Infrared Sensor (8) detects when cup is placed and picked up from the Tray (7) and reports to the Micro Processor of the machine. Tray (7) gets wiped and cleaned after each cycle by a Wiping Mechanism (9) and wiping Blade (10) as shown and further explained in (FIGS. 6A-6B) Mounted onto the Cup Dispenser (11) is a protective plate (23) behind which a UVC LED (24) is Secured. The UVC LED (24) Beam will sanitize the entire length of the Delivery Tray (7) killing all possible Viruses or Bacteria, once the final product has been taken by the end user and the Tray is retracted to its home position. The UVC Light is controlled by a microprocessor & a Smart Relay which also analysis the UVC light amperage draw and the that the device is properly working, since the UVC LED hits up very fast and may cause harm if not properly controlled, further illustrated in (FIG. 15). The Nitrogen infused Beverage under pressure is dispensed through the Kegerator original Slow pour beverage faucet (14a) by having the handle (14) move forward with the use of a linear actuator (12a) with an attached Lever Pusher (13), which is controlled by the machine's Microprocessor; thus enabling a forward motion for pouring. Visually this system is appealing to the customer reminding him of the Hand Tap motion of a self serve system. Technically this pouring system enhances the final product by allowing for an internal pressure built up right before the pour. The preferred embodiment shown in FIG. 1. & FIG. 3 uses a Stepper Motor (12) to turn the Lever Pusher (13) against the Kegerator Handle (14) in a slow but forceful movement which allows for an increase control over the automated pouring process, further illustrated in (FIG. 3). The dispensed beverage is flavored from a Bag N Box concentrate (19) stored on shelf (16) at ambient temperature as well as the Flavoring, Micro Processor controlled, Peristaltic Pumps (20) Further explained in (FIGS. 11A-11B). Shelf (16) which is secured to the main Frame of the machine (17) carries The Bag N Box System (19) as well as a "Nitrogen Generator" (18) as the preferred embodiment available by way of example from Bunn-o-Matic Corporation of Springfield Illinois and commercially known as NITROGEN GAS MODULE and hereinafter referred to as "Nitrogen Generator". The "Nitrogen Generator" is secured to the shelf by two brackets (18a) one in the front and one in the back which are mounted to the shelf (16) and prevent the Nitrogen Generator from vibration travel. The Nitrogen Generator integration into the kiosk is further explained in (FIGS. 12A-12B) The present invention may work as well with a conventional Nitrogen Gas Tank and a conventional Nitrogen Gas Dual Regulator.

FIG. 3 provides a schematic diagram depicting a closer view of the Automatic Beverage dispensing Lever Pusher (13) in Beverage Pouring mode, when a command was initiated by the Kiosk's Computer and Microprocessor. The Dispensing Motor (12) moves forward turning Lever Pusher (13) against the upper portion of the Fountain Handle, overcoming the handle's spring loaded normally closed position, and allowing for a natural liquid flow through the slow pour beverage faucet (14a) simulating a human's hand motion, as was intended by the beverage "Kegerator" manufacturer. The Beverage dispensing Lever Pusher (13) is not easily visible through the large viewing window (306) of the kiosk shown in (FIG. 16) and can hardly be recognized by the consumer standing in front of the machine thus creating an illusion that the Faucet Handle (14) moves forward on its own, when the Machine is in a dispensing mode. Prior to initiating a dispense command the Cup is detected by an Infrared sensor, or ultrasonic sensor (4) shown in (FIG. 2) In case of a faulty, Leaky cup the Kiosk has a secondary emergency measure at all times where a miniature float Switch (21a) is attached to the drip tray (21), and at any given moment if the float switch is triggered due to an elevated liquid accumulation in the tray the switch triggers the Kiosk microprocessor Emergency port which turns off the energy to all Liquid Solenoids, pumps, and Nitrogen Solenoid, thus preventing any possible overflowing, as well as reporting such incident to the dedicated server.

Figure 4:
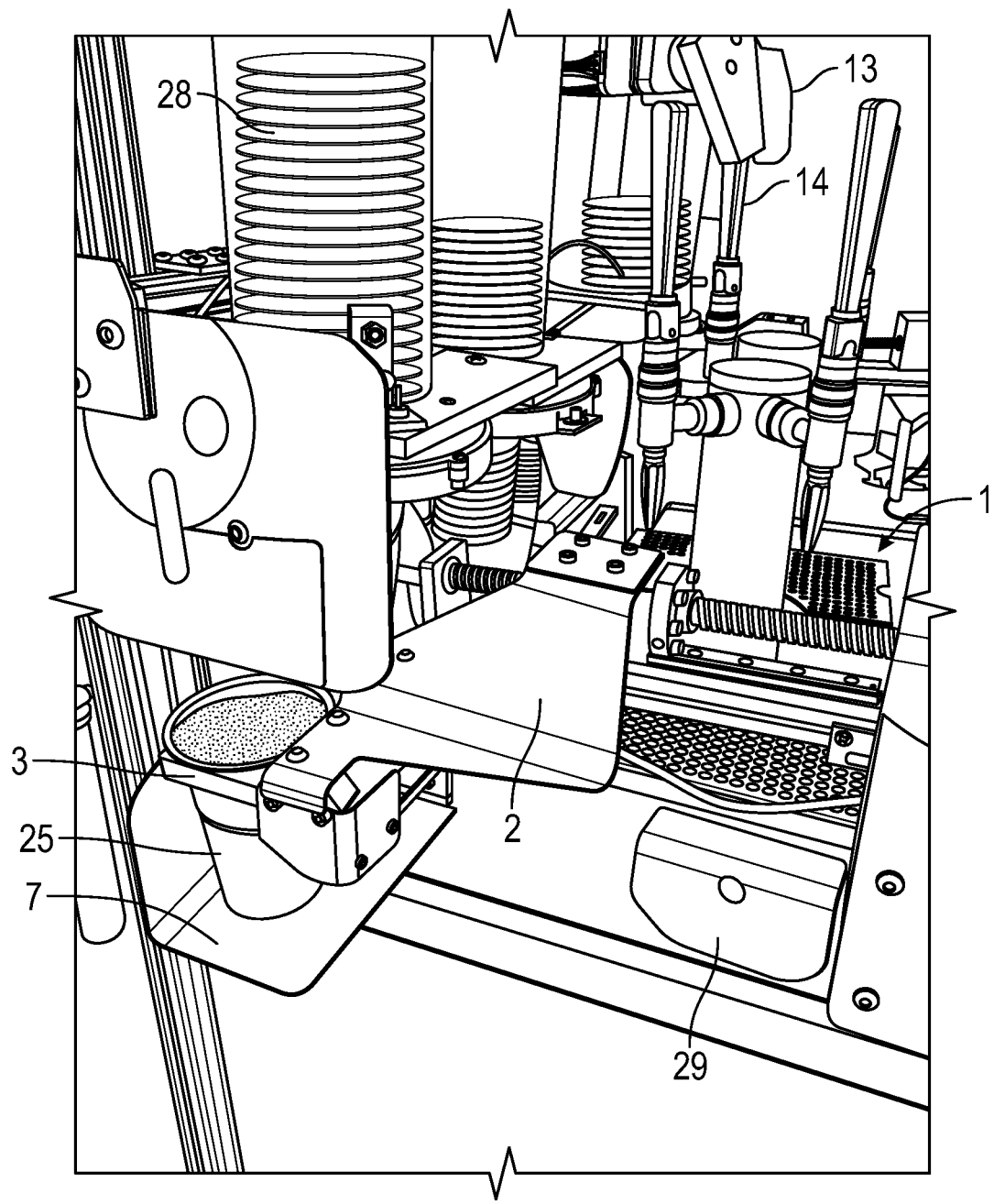
FIG. 4 provides another schematic diagram depicting a close up view of the linear robotic arm in the process of delivering a full cup onto the Delivery Tray in the first embodiment of the Invention. An internal video camera for recording machine events is also depicted.

FIG. 4 Provides a schematic diagram depicting a close up view of the linear robotic arm (1) in the process of delivering a full cup (25) onto the Delivery Tray (7) by moving Travel Bracket (2) forward to its delivery position. Once Cup (25) is Placed onto the Delivery Tray (7), The Arm will be lowered towards the narrower bottom of the cup and retracted back to Home position. A hidden Camera (29) is situated under the Arm (1) which may report to the machine onboard computer any malicious events by the consumer or any technical malfunction in the machine delivery system with actual video footage which can then be sent to the machines dedicated server for external review.

Figure 5:
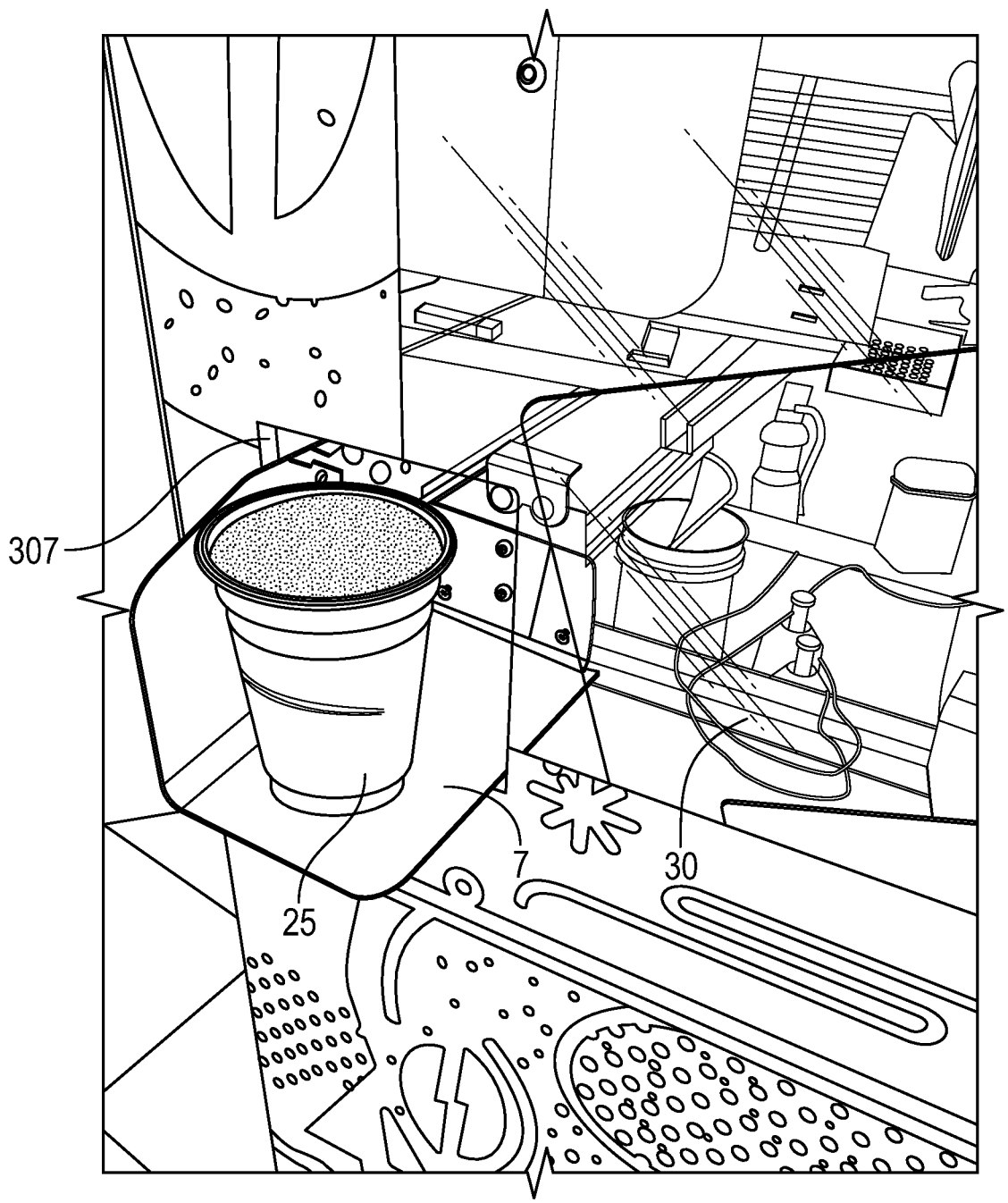
FIG. 5 provides another schematic diagram depicting a close up view of the delivery tray exiting the vending Machine for ease of retrieval by the end user, and showing delivery door in an open position.

FIG. 5 Provides a schematic diagram depicting a close up view of the Delivery Tray (7) which protrudes beyond the delivery opening (307) of the Kiosk, allowing the consumer ease of access and retrieval of the final Beverage product (25). The Delivery Tray (7) simulates almost a human hand serving the customer with his final product. This final step of a fully automatic Kiosk enhances the experience of the consumer and provides him with a sanitary environment for picking up his final product thus boosting his confidence with the equipment. While Delivery door (30) is in open position, Ultrasonic sensor (8) awaits cup removal by the consumer with a proper given time as well as a verbal message produced by the machine's computer "please pick up your cup" sounds and then the Microprocessor orders the Delivery Tray (7) back inside the Kiosk Door, while Delivery Door (30) closes.

Figure 6A:
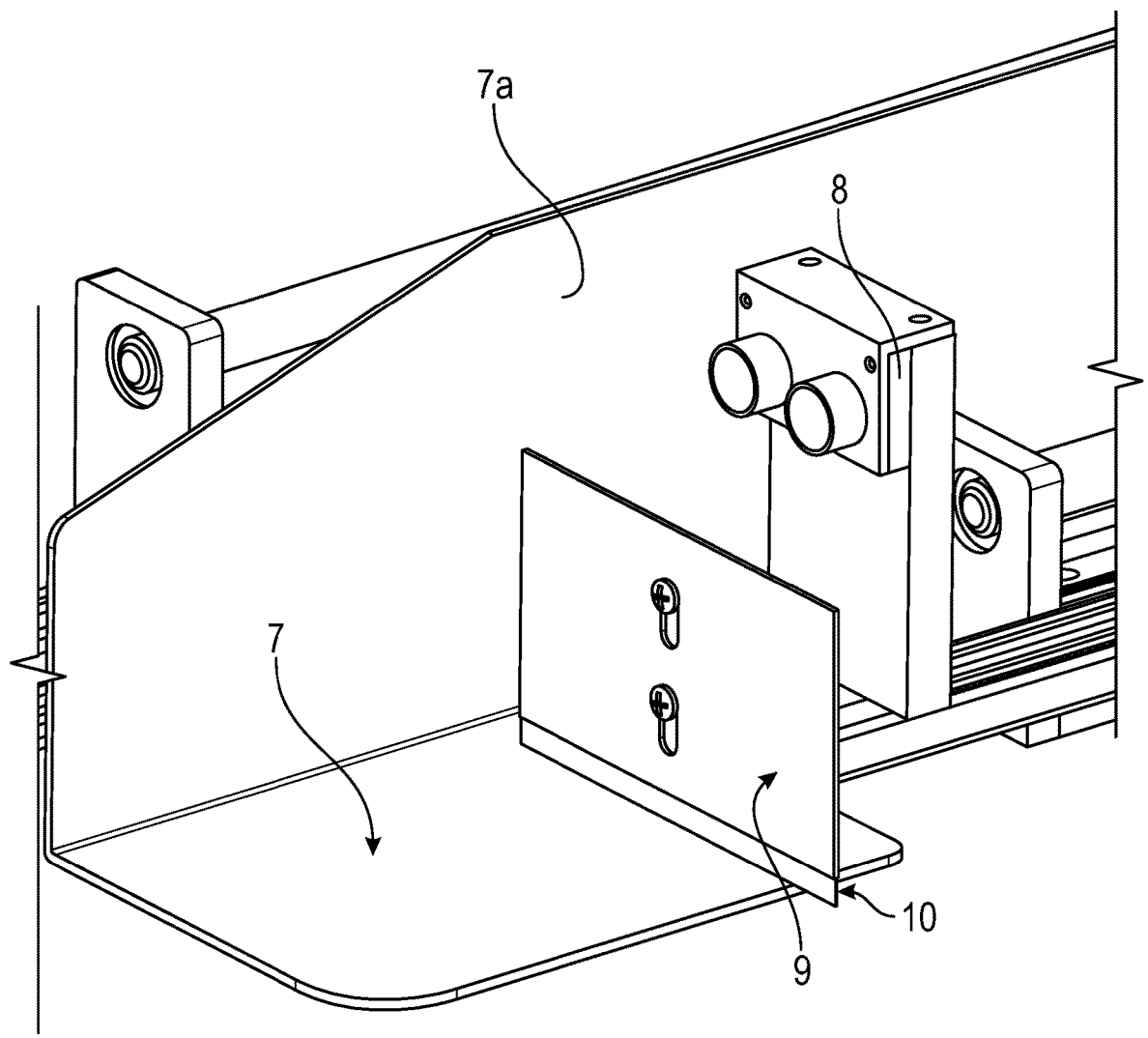
FIG. 6A provides another schematic diagram depicting a close up view of the Linear Robotic Delivery tray as well as linear Cleaning Wiper and ultrasonic sensor present in the first embodiment of the invention.

FIG. 6A Provides a schematic diagram depicting a closer view of the Linear Robotic Delivery Tray (7) with a protective side wall (7a). The Delivery Tray (7) is attached to a Linear Track which is capable of moving the tray Forward and Backwards. Inside the Delivery Tray (7) a linear Cleaning Wiper (9) travels the entire length of the tray and wipes the tray clean in case of any spillage using a rubber blade (10). The Cleaning Wiper (9) has a dual purpose in the kiosk. In case the consumer decided not to pick up his cup within a given time, or maliciously place an object on the tray (7) while the Tray is in a retrieval process, the Ultrasonic Sensor (8) reports the object to the kiosk's Microprocessor, and once the delivery Door (30) seen in FIG. 5 has fully closed, the Cleaning Wiper (9) will Push the Cup or Object forward while the Delivery Tray (7) retracts backwards and cause the cup or object to fall right inside a Water Proof, shock proof, spill proof Waist Basket (33) shown in (FIG. 7).

Figure 6B:
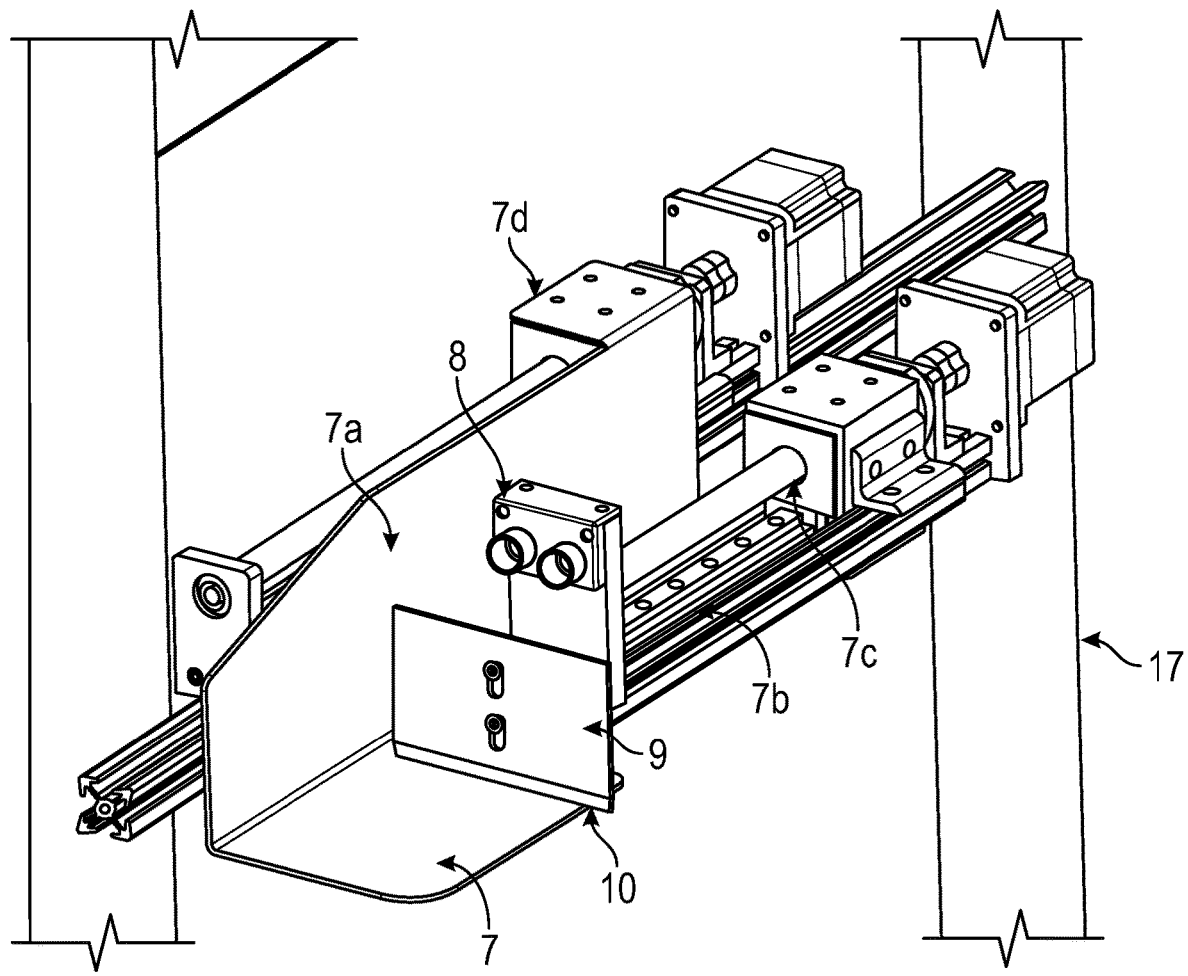
FIG. 6B Provides a schematic diagram depicting a broader view of the Linear Delivery Tray (7) Assembly and Linear Wiper (9) Assembly.

FIG. 6B Provides a schematic diagram depicting a broader view of the Linear Delivery Tray (7) Assembly with Linear Track (7d) which moves the tray forward and reverse, as well as Wiper assembly linear Track (7c) with extending arm (7b) which moves Wiper (9) back and Forth along the Tray. As well as both assembly's as are situated inside machine Frame (17).

Figure 7:
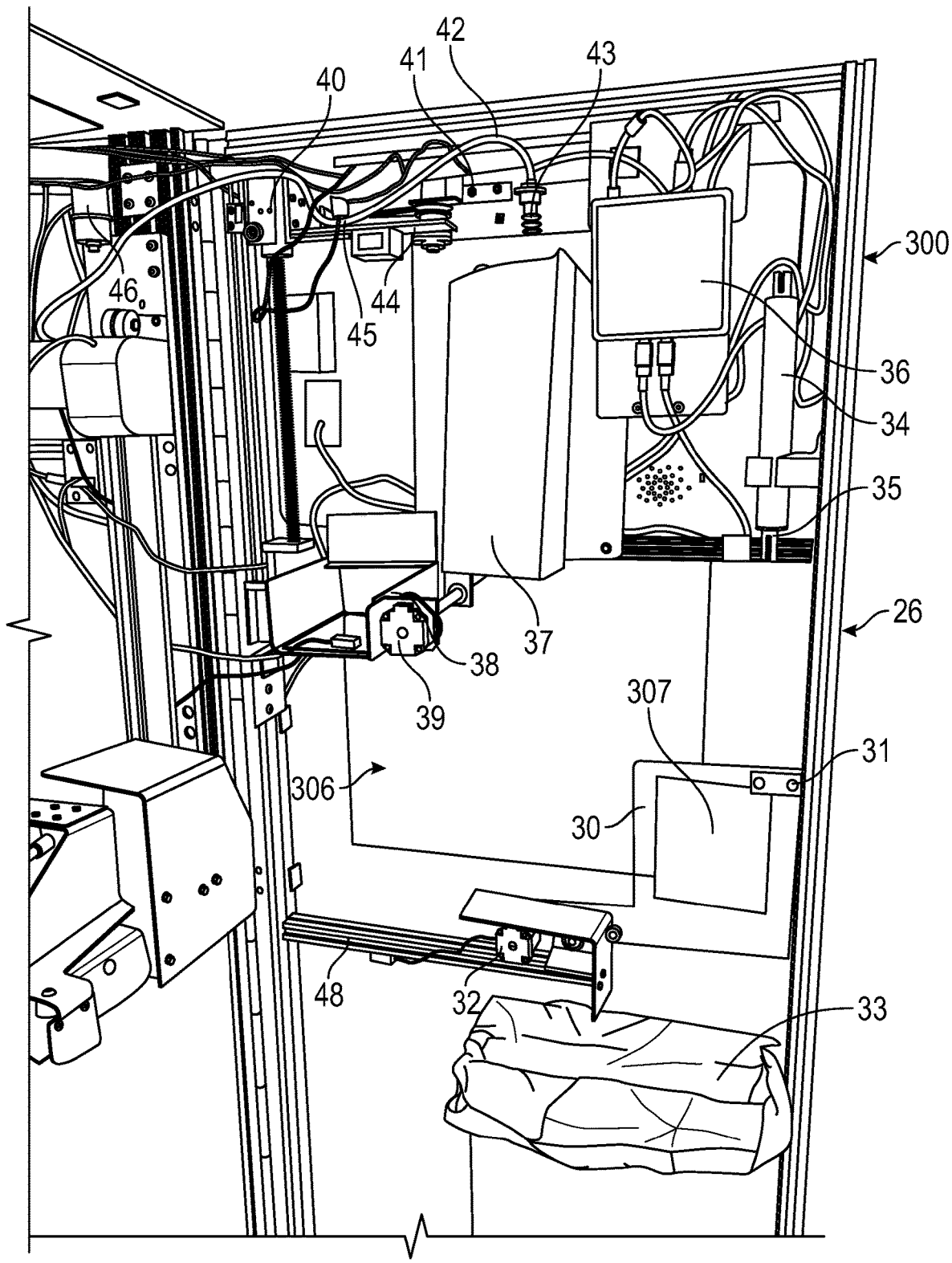
FIG. 7 Provides another schematic diagram depicting an inner view of the Automated Nitro Kiosk Door with all mounted components, including Delivery Door, Waist Basket, Automatic Lock, Mini Computer & Linear Robotic Lid Dispenser.
Figure 16:
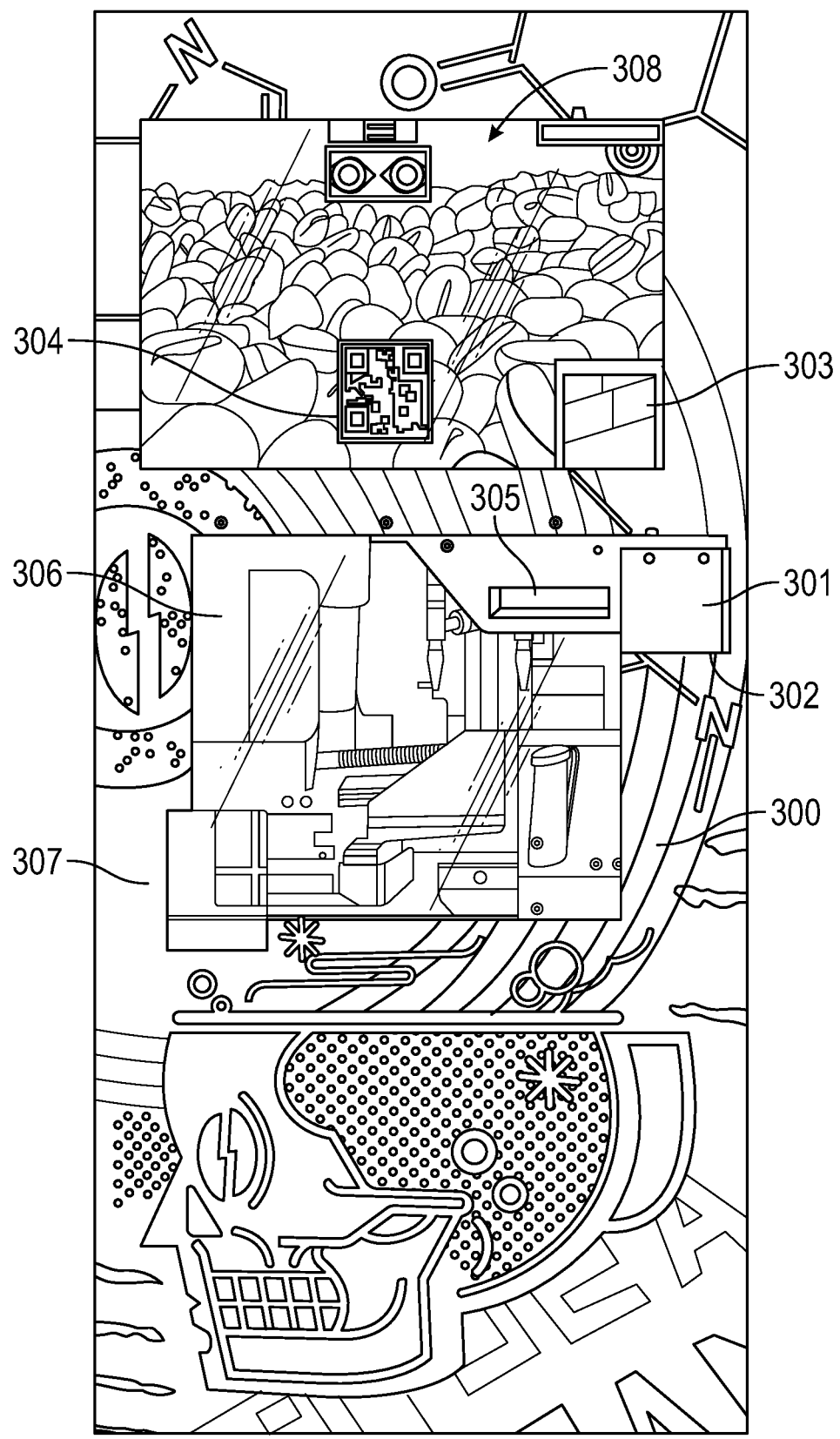
FIG. 16 provides a Frontal View of the Automated Nitro Kiosk depicting a view of the QR reader in accordance with aspects of the present disclosure.

FIG. 7 Provides a schematic diagram depicting an inner view of the Automated Nitro Kiosk main Door (300) with all mounted components. The Delivery door (30) swings open in an upwards 180 Degree movement utilizing a stepper motor (32) and a timing pulley system, clearing up delivery opening (307). The entire delivery Door Mechanism is mounted onto the Door Frame with an extended Framing Arm (48). A protective reinforcing Lever Blocker (31) is connected to the main door frame (26) which blocks any forward pushing of the Delivery door (30) inwards by an intruder. The entire Delivery Door (30) and Delivery Opening (307) are located partially within the Viewing window (306), which adds to the viewing excitement of the Nitro Kiosk. Under the Delivery Door hangs a Water Proof/Shock Proof Waist been (33) which can easily be removed for cleaning. The Door Locking Mechanism is comprised of an Actuator (34) with its extending Rod (35) acting as a Lock against a bracket located in the inside body of the machine frame. The Actuator Lock (34) can be opened and closed via the Touch Panel Operator control System as well as by a Remote Key. A Mini Computer (36) is the center of Command & it works with the Kiosks VMC Vending Machine Controller Microprocessor, as well as with the QR Reader (302), and Touch Screen Display (308) both illustrated in (FIG. 16).

An automated Lid Dispenser (40) is comprised of a Linear Track moving up and Down, a Lid Transporter Arm (44) which pivots 180 degrees with Motor and pulley system (45) and transports a retrieved Lid from Lid Stack (37) to a motorized Lid Tray (38). Lid retrieval is done through A Suction Cup (43) a Suction Hose (42) a Miniature DC Suction Pump (46) and a Limit sensor (41) which detects a Lid. A removable Lid Stacker (37) is situated at the door of the machine. Once the Lid is retrieved from the stacker (37) and brought down to the Lid Tray (38) The Microprocessor of the machine will stop the DC Suction Pump (46) thus releasing the Lid to Fall inside the Lid Tray (38). A Lid pusher (47) will move the Lid Forward using a Motorized Linear Track (39), all the way towards the Lid Opening (305) shown in (FIG. 16.) The Lid Stacker (37) has a Magnetic Base which allows for easy replacement by the Kiosk Operator with proper position & accuracy.

Figure 8:
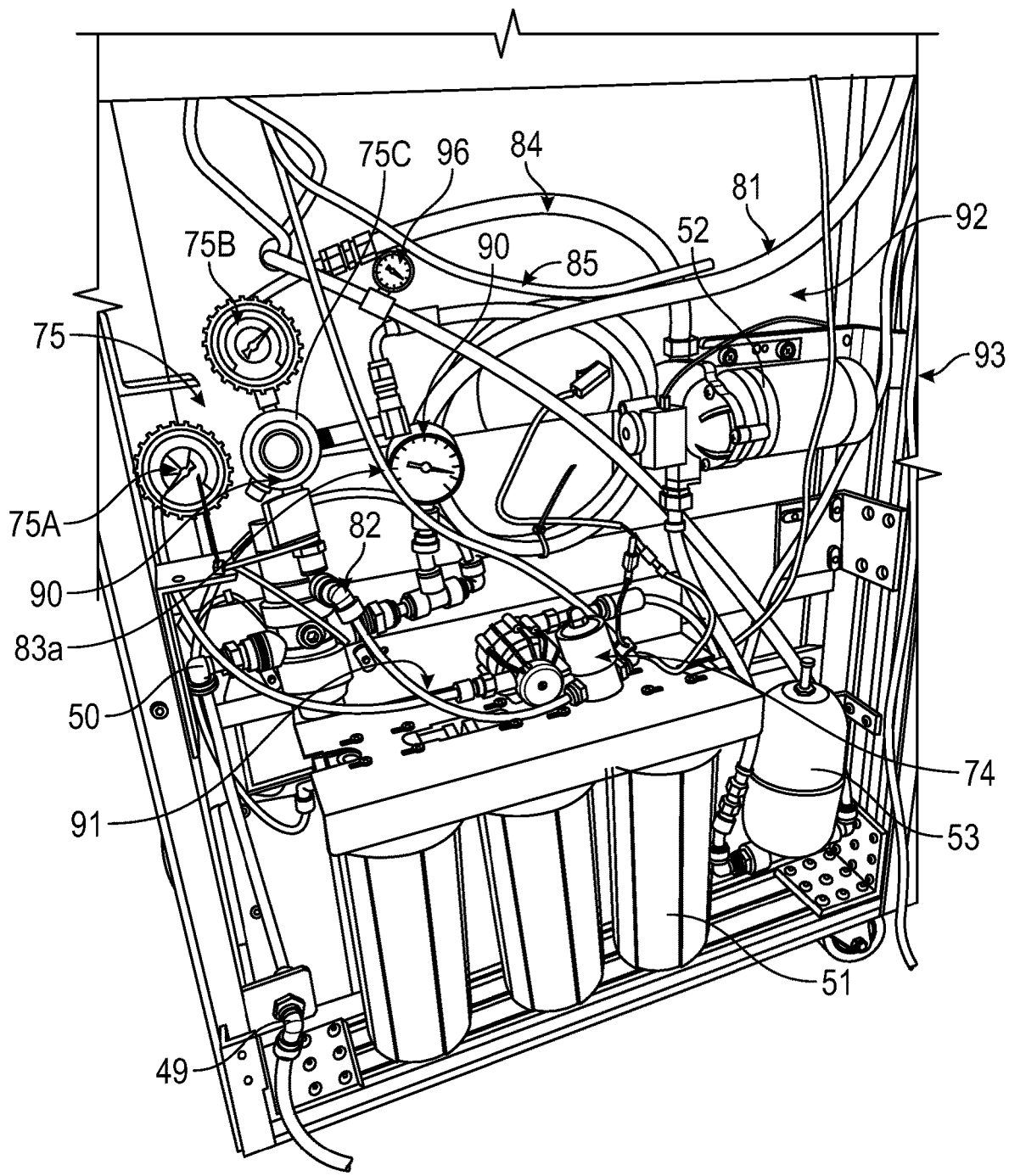
FIG. 8 provides another schematic diagram depicting the lower back view of the Automatic Nitro Kiosk with the Water Filtration System and Nitrogen Regulator as they are situated.

FIG. 8 Provides a schematic diagram depicting the lower back view of the Automatic Nitro Kiosk with the Triple Water Filtration System (51) Water Pressure Regulator (50) and Nitrogen Regulator (75) as they are situated in the back of the Kiosk. The Main Water Line is connected to A Quick Connect elbow (49) attached to the Automatic Kiosk Frame. Water Hose extends to Water Pressure Regulator (50) not to exceed 50 PSI and calibrated as viewed by water Pressure Gage (90). Water than flows into the Triple Filtration System (51) through hose (91). Water flows out of Water Filtration System through hose (84) to a DC powered Water Pressure Pump (52) such as manufactured by FLOWJET corporation which boosts up the Lower water PSI exiting the Triple Water filtration System (51). Water than flows to a Mini pressure Tank (53) such as manufactured by SHURFLO Corporation or JABSCO to maintain constant water pressure in the system, which is needed for proper Nitrogen & Water Mixing. Water than flows under pressure towards the Back wall of the Kegerator through hose (85) with PSI level visible by Gage (96) and onto water Storage Tanks and chilling station inside the refrigerated unit further illustrated in (FIG. 11A). Nitrogen which is produced on Demand by the "Nitrogen Generator" such as manufactured by BUNN as the preferred embodiment in this invention is regulated down from 120 PSI preset by the Manufacturer to a useful 50 PSI by the modified Nitrogen High/Low Regulator (75) with a new Coupling (82) of the present Invention further Illustrated in (FIG. 12B), where Gage (75b) is Low end, (75a) is High end and (75c) is the regulating Knob. The Nitrogen Production System of the Automatic Kiosk eliminates the use of Bulky and Dangerous Nitrogen Tanks. Although, the present invention may work with a conventional Nitrogen tank and a conventional High Low Nitrogen Regulator. Nitrogen Flow is allowed into the system through a safety Solenoid (74) which is normally in a closed position. Nitrogen Gas will Flow through Line (83a) through a hole in the back of the Kegerator and into a Nitro Beverage Infuser Unit Which properly works at 50 PSI, and some units work at 35 PSI of Nitrogen. The Nitro Beverage Infuser sits at the base of the Kegerator alongside Bag N Box Pumps and Liquid Flow Solenoids of the present Invention further explained in (FIG. 11A). Nitrogen Gas Line (81) flows between the "Nitrogen Generator" and the High/Low Modified Nitrogen Regulator (75). (92) is the Back wall of the Kegerator and (93) is the Back door of the Kiosk's lower compartment which has a viewing back window for looking at some of the Gauges, and Filtration system without the need to open the door.

Figure 9A:
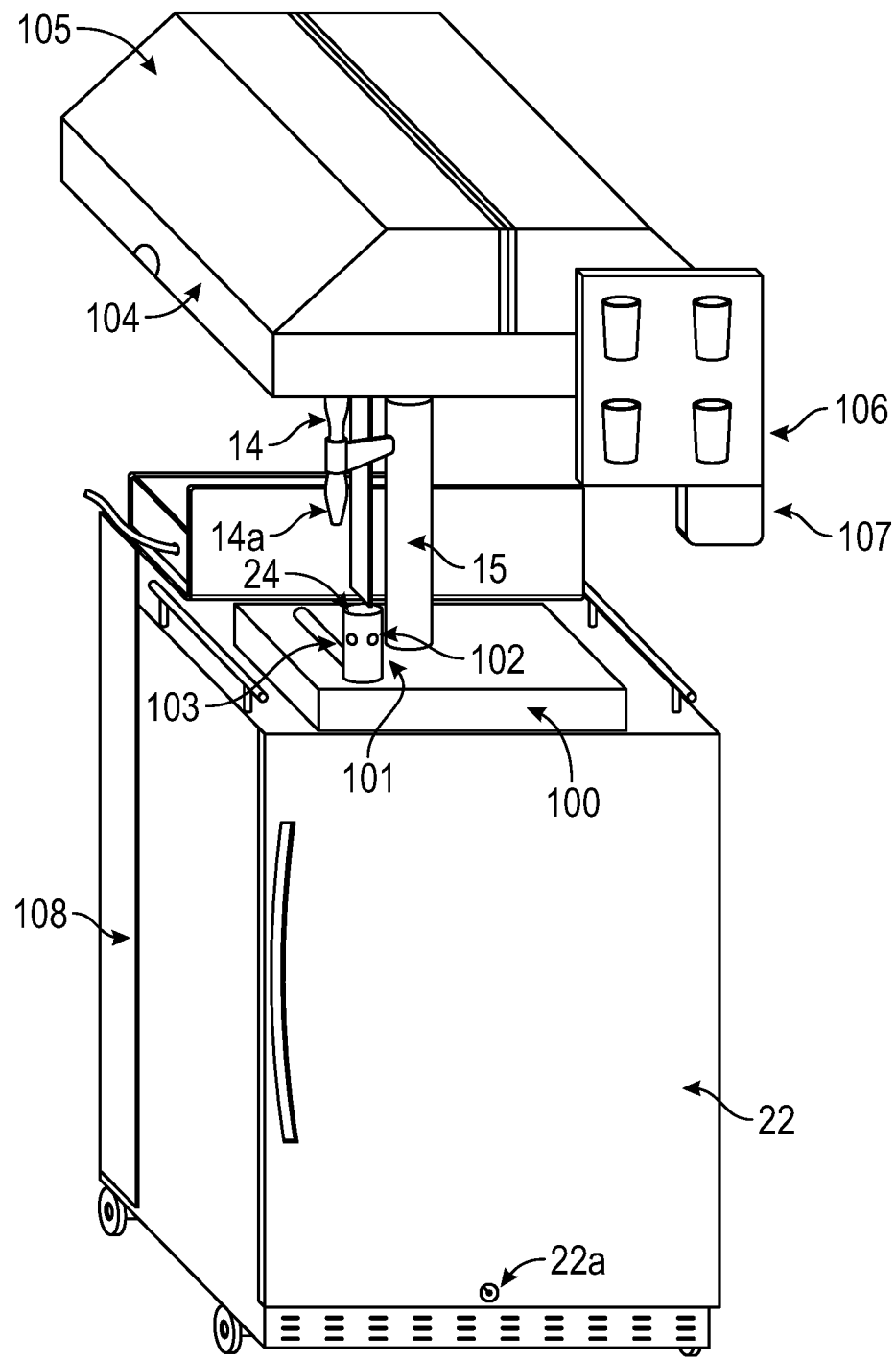
FIG. 9A provides a perspective diagram depicting a front view of a second embodiment of the automated vending kiosk invention in accordance with aspects of the present disclosure.
Figure 9B:
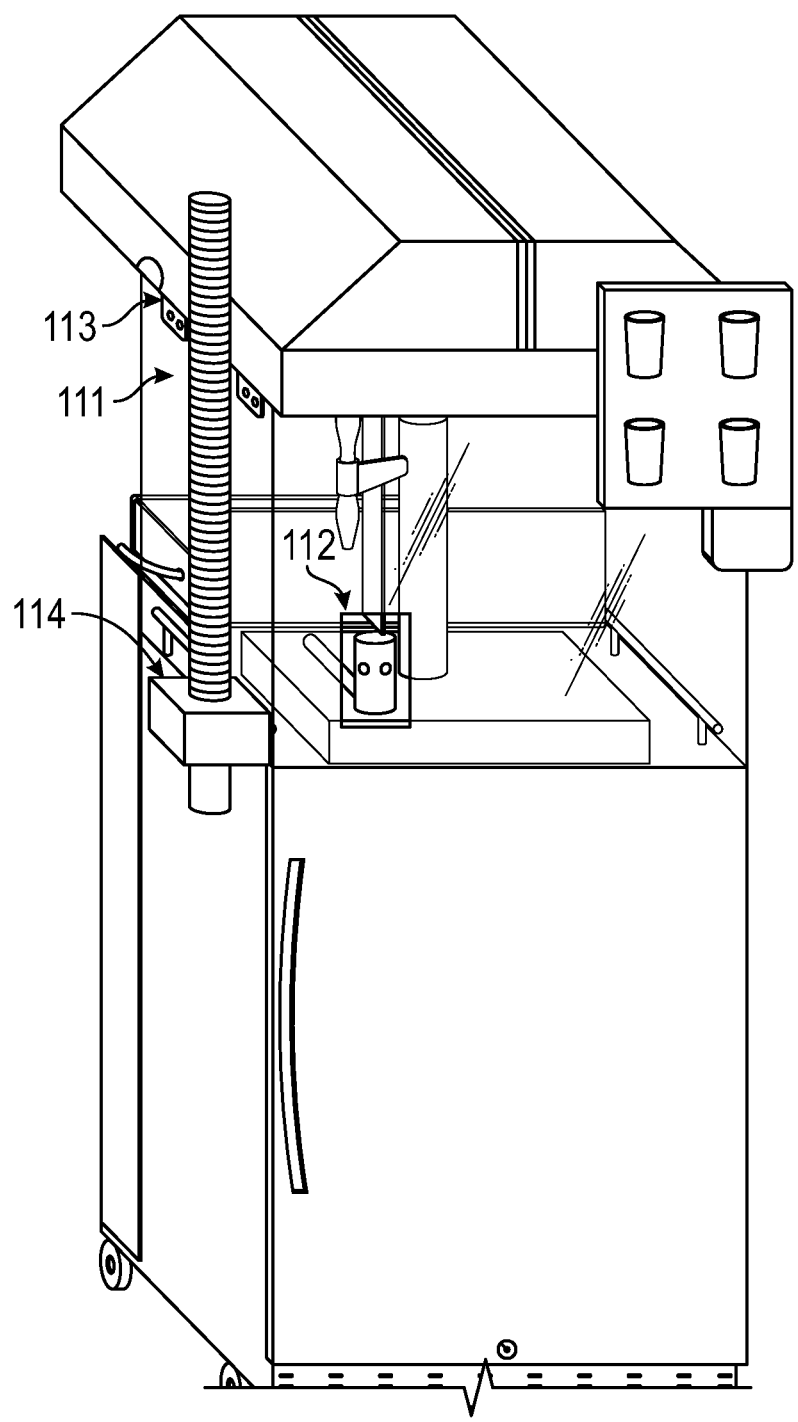
FIG. 9B provides a perspective diagram depicting a front view of a second embodiment of the automated vending kiosk invention with a protective polycarbonate Cover and cup dispenser in accordance with aspects of the present disclosure.
Figure 10:
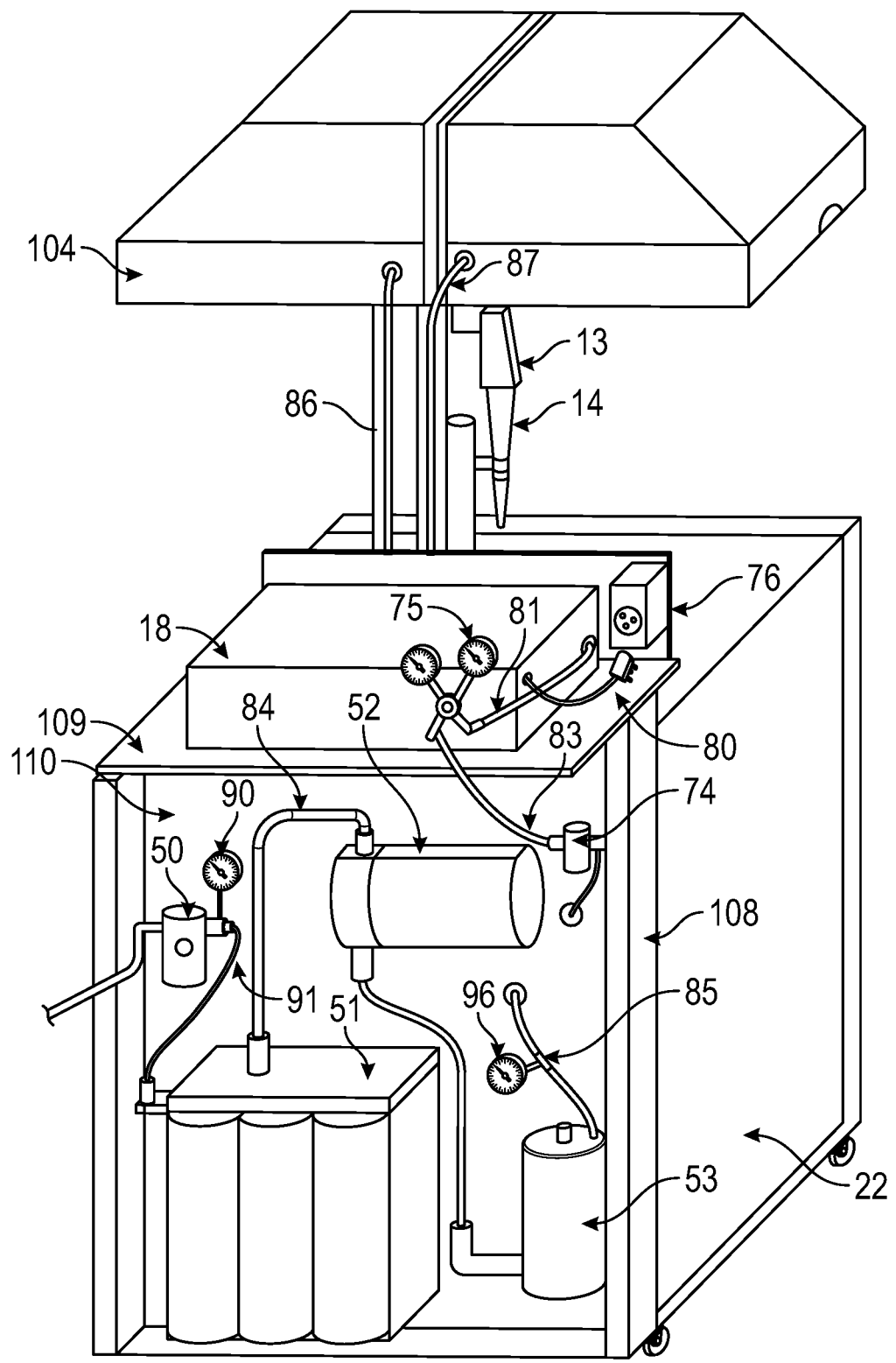
FIG. 10 provides a perspective diagram depicting a Back view of a second embodiment of the automated vending kiosk invention in accordance with aspects of the present disclosure.

FIG. 9A provides a perspective frontal view of a second Embodiment of this invention, with a smaller foot print limited to the actual size of the Kegerator used and its capacity, by this more versatile semi automated kiosk. Kegerator (22) sits on a platform with caster wheels onto which a back Framing is mounted (108) further explained in (FIG. 10). An automatic beverage delivery station is comprised of two systems. A Large size drip Tray (100) which sits on the upper portion of the Kegerator. Inside Drip Tray (100) is an internal Linear Track (103) which travels along its axis and transports a Cup/beverage container Cradle (101) from a placement position by the customer to an automatic filling position near the Kegerator Tower (15). In This embodiment of the present invention a customer may choose his beverage preference either on the touch screen (106) or on a mobile app which will activate the machine through a QR reader (107). Upon the Selection of the Beverage the customer will place a Cup or a Beverage container in the Transport Cradle (101), Sensor (102) detects the object and will transport the cup or beverage container to the filling area near the Kegerator tower (15). The Machine will dispense automatically the chosen Nitro or Cold Brew beverage flavored or non flavored utilizing the Automatic dispensing Lever Mechanism (13) shown in (FIG. 10) through the Kegerator slow flow nozzle (14a) with the handle (14) pushed forward automatically. Sensor (102) may be a dual sensor system in case different size cups and beverage quantities are sold, which will insure that the proper cup size is placed at the Cup/Container Transport Cradle (101). The Cup/Container Transport (101) will move forward outside the Kiosk Parameter through door opening (112) allowing the customer for easy retrieval of his Beverage further illustrated in (FIG. 9B). UVC Light (24) will sanitize the station for the next customer. The Upper hanging compartment (104) contains the Bag n Box flavoring for the nitro beverages as well as the peristaltic pumps. Each side has a gull wing door (105) for easy excess and product replenishment. Plexiglas shield not shown may be placed around the entire filling station with an opening (112) for cup placement and cup retrieval.

FIG. 9B provides a perspective diagram depicting a frontal view of a second embodiment of the semi automated vending kiosk invention with a protective shield surrounding the filling station made of polycarbonate or Plexiglas (111) which will be mounted using brackets (113) to the Bag N Box compartment (104) on top of the Kegerator with an opening (112) for cup placement and cup retrieval as well as an external cup Dispenser (114). The customer may choose to have his nitro Brew pour in a cup or in his own Beverage container.

Figure 9C:
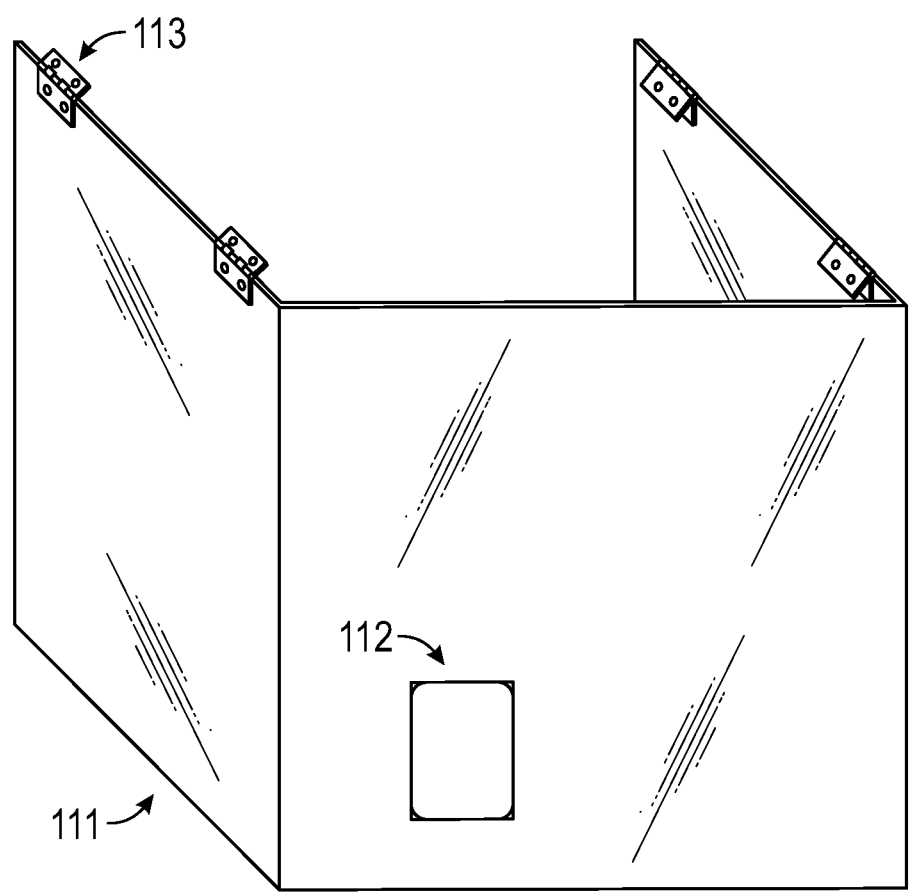
FIG. 9C provides a Perspective Diagram of the Polycarbonate Protective cover of FIG. 9B alone.

FIG. 9C Provides a Perspective Diagram of the Polycarbonate or Plexiglas Protective cover described in (FIG. 9B)

FIG. 10 provides a perspective Back view of the second Embodiment of this invention. Framing (108) maintains an upper shelf (109) upon which the "Nitrogen Generator" (18) rests and is secured. The "Nitrogen Generator" electrical outlet (80) is plugged to the Invention Smart Relay Box (76) for proper monitoring of the "Nitrogen Generator" (18) as an integral part. The "Nitrogen Generator" direct Nitrogen Gas Line (81) is connected through a Custom Coupling device (82) to a Dual Stage Nitrogen Regulator (75) which regulate the Nitrogen output to the Proper PSI required by the "Nitrogen Beverage Infuser" along the regulated line (83). The Nitrogen Gas is interrupted by a Gas Solenoid (74) which is controlled by the Microprocessor of the Kiosk for added security. A back Plate (110) is secured to the Back Frame (108). The entire Water system is secured to Back Plate (110). The water system is comprised of Water Regulator (50) with PSI Gage (50a). Three Stage water filter (51) filters the tap water and exit the filter at low pressure through water line (84), water gets a PSI Boost through Water Pump (52) which flows under pressure to Accumulator tank (53) and enters the Chilling station inside the kegerator through hose (85) with PSI level visible by Gage (96). Flavors are run from the Bag N Box Upper unit (104) through hose sleeves (86) and (87) to the flavor mixing station inside the Kegerator further explained in (FIG. 11A). Automatic Dispensing Lever Pusher (13) is shown as well as the Nitro Handle (14).

FIG. 11A Provides a schematic diagram showing the Bag in Box beverage concentrate and nitrogen infusing system of the invention, in combination with a "Nitro Beverage Infuser" available by way of example from Wilbur Curtis Co. of California and commercially known as CURTIS model NIB2 hereinafter referred as "Nitro Beverage Infuser" (64) and a "Nitrogen Generator" available by way of example from Bunn-o-Matic Corporation of Springfield Illinois and commercially known as NITROGEN GAS MODULE and hereinafter referred to as "Nitrogen Generator" (18). The present invention provides a system for preparing and dispensing of chilled nitrogen infused beverage comprising: a water regulated inlet (40) preset to a specific Water Pressure using regulator (50) and PSI gage (50a). Water gets filtered through a 3 stage filtration system (51) then brought up to a useful pressure by a Pressure Pump (52) such as manufactured by FLOWJET co. which then is accumulated under useful pressure of 50 PSI & maintained inside a Mini Accumulator tank (53) such as manufactured by SHURFLO Co. in order to properly work with the Nitrogen Beverage infuser. The water PSI level going into the "Chilling Station" (54) can be seen by Gage (96) and adjusted through the Accumulator Pressure Tank air valve up or down to maintain the required 50 PSI. The Pressurized water is then stored in the Kegerator inside a Dual, Tall & Narrow Stainless Filter Housings (54a) & (54b) which were converted into a water chilling station in this invention for space saving and optimization of the Kegerator internal storage capacity. The water gets chilled quicker and more efficiently due to the narrow shape of these filter housings with a total capacity of 2 Gallons. Since the machine by design draws water from second filter housing (54b) the water is at optimum chilled temperature of 33F-34F while water from the first Filter housing (54a) starts filling the gap, there is no contact between the water entering Filter Housing (54a) at ambient temperature and water exiting Filter (54b) at optimum chilled temperature. Hollow stainless tubing (94) direct the water flow from the Bottom of each filter housing to the top. Connecting Valve (95) allows the water to flow between Filter housing (54a) and (54b). This space saving technique helps the kiosk maintain its smaller foot print as well as increase the probability that the customer will drink his Nitro Beverage at optimum Chilled temperature; contrary to the use of one bulky pressurized container found in the market place shown in the Charles Kleinrichert U.S. Pat. No. 9,623,383 B1. In this embodiment of the present invention chilled water exiting the Chilling station (54b) is split through coupling (55) to two Bag N Box Nitro Mixing stations. (56a) And (56b) are check valves preventing back flow into the water chilling unit (54). High Powered Peristaltic Pump (58) will draw a concentrate from Bag N Box (60) and mix it with pressurized water otherwise interrupted by electric solenoid (57a) controlled by the microprocessor of the machine which will flow through one way check valve (62) for extra back flow protection and into the "Curtis" Nitro Infuser NB2. In this commercial set up Bag N Box (60) may be coffee concentrate while Bag N Box Concentrate (61) may be a Liquid Creamer, which will operate with Pump (59), Electric solenoid (57b) and one way check valve (63) and into the "Curtis" NB2 second port. Motor control microprocessor (78) constantly monitors Motor Amperage draw which correlates with PSI buildup and analysis permissible PSI based on a Logarithm preset.

A multi port Flavoring Manifold (71) available by way of example from Macmaster-Carr Company is used as a mixing chamber between the concentrates and pressurized water. The different Coffee flavor concentrates are pumped using Peristaltic Pumps (20) from Bag In Box containers (19) stored at ambient temperature. 25 Psi rated check valves (72) located at every inlet of the Manifold (71) prevent back flow towards the pumps. The Concentrate Coffee mixed with the pressurized water, flow through the inlet of the "Nitro Beverage Infuser" at which point they get infused with Nitrogen. Nitrogen is constantly produced on demand by the "Nitrogen Generator" (18) and is regulated from 120 PSI produced by the "Nitrogen Generator" unit down to 50 PSI which is suited for the "Nitro Beverage Infuser" utilizing a custom Nitrogen regulator of this present invention (75). The Nitrogen Gas is interrupted by an electronic Solenoid (74) which is controlled by the machine Microprocessor for extra measure of security and control. The mixture in line (73) flows towards the Tap Fountain (15) and is interrupted by the original Tap Handle (14) which is sold with the Kegerator unit. The Tap handle will allow the Nitrous mixture to flow out by moving the handle with Electronic controlled Lever Pusher (13) forward as part of this invention. The "Nitro Beverage Infuser" (64) available by way of example from Wilbur Curtis Co. of California and commercially known as CURTIS model NIB2 or the "MININIMV1 nitrogen infusing module available from Micro-Matic Corporation, are all equipped with a control knobs which allows more or less nitrogen into the unit thus creating a Frothy top over the drink known as a head, or less. This feature is designed, so a restaurant/Bar owner manually set up the unit as he pleases and leave it with the setting for future use. In our invention Knobs (65) & (66) are controlled by Motors (67) & (68) which are controlled by the Machine Microprocessor (78). This feature may allow a customer to control how frothy he/she want the final drink to be, on demand while he/she makes a product selection. Ambient Temperature surrounding the machine may also affect the Nitrogen expansion which in turn may require adjusting the Nitrous Knobs (65) & (66) to suit the amount of head produced. If not adjusted it may create overflowing or less than full cup in an automatic machine with presets. In our invention a Temperature controlled Logarithm may cause the motor (67) & (68) to move the frothing Knobs (65) & (66) in a positive or negative direction based on the thermometer probe read (88) of the Ambient Temperature surrounding the machine, as well as inside the refrigerator with the second temperature probe (89) and through a temperature combination analysis based on a logarithmic pre-programmable chart turn the Frothing Knob to optimal setting and thus preventing overflow (too much Head) in case of nitrous expansion due to increase in ambient temperature and/or refrigerator temperature or low head and not full cup due to an ambient temperature decrease and/or refrigerator temperature decrease. The Doted lines Marked (77) show the refrigerated section of the Kiosk while all components outside of the Lines are at Ambient Temperature. In the preferred embodiment Coffee concentrate to water mixing ratio or creamer to water ratio, are established by setting the BIB concentrate pump (58) & (59) RPM relative to the incoming Chilled water PSI seen by PSI Gage (96). Other embodiments of the present invention incorporate more sophisticated and dynamic adjustment possibilities utilizing pulse width modulation control system to drive the pumps which may adjust pump speed and torque relative to the incoming water PSI which may be electronically sensed and computed into a more dynamic system. Utilizing preprogrammed logarithmic charts can increase the accuracy, of the mixture to overcome the small variations in water pressure which may be the result of street water PSI variables as well as Nitrogen Gas PSI variations due to the system itself. In the proffered embodiment of this invention Coffee concentrate & Cream concentrate are proportionately mixed prior to nitrogen infusion, while ambient temperature flavors are mixed in under pressure post nitrogen infusion. In addition to the standard coffee Flavoring system which is based on Computer driven peristaltic pumps which are accurate in administering flavors and the like, other possibilities may also include Liquid vitamin concentrates, liquid proteins, as well as £'BD oils which can be infused Into the Nitro cold brew. In addition to the Nitro Cold Brew dispensing system, an additional dispensing tap may be added to tower (15) electronically controlled as well for dispensing Cold Brew beverage. Where an additional line will Bi Pass the "Nitro Beverage Infuser" and direct the flow to the second nozzle with a second flavoring system.

FIG. 11B Provides a schematic diagram showing the Bag in Box beverage Flavoring concentrate system and nitrogen infusion in a close up. All Flavor Bag N Box of the present Invention are located in a separate section of the Kiosk Shown in (FIG. 1) (19) on a flavoring Shelf (16) and stored at ambient temperature to prevent any type of coagulation. While the Coffee and Creamer Bag N Box are stored in the refrigerated Kegerator (22). The Flavors are infused under Nitrogen Gas pressure at the final step of the Nitrogen Infused Drink process through a Manifold shown (71) in which the different Flavors are each administered through a one way Check valve (72) designed to withstand a minimum pressures of 25 PSI. In this commercial model the Nitrogen infused coffee flows through a check Valve (69) and in to the Manifold (71) where is may be flavored under pressure by any one flavor from the Bag N Box System (19). The Creamer is Separately infused and will be mixed with the coffee outside of the Manifold (71) through a check valve (70) and a 2 way coupler (73) straight to the slow flow Faucet (14a). This system is designed to introduce the Creamer at the top of the Drink while the Nitro Coffee gets flavored separately in the Manifold (71). This way there is no mixing between the Flavored Nitro coffee and The Latte style Nitro coffee using the creamer. The Flavored Nitro infused coffee or coffee Latte of the present invention tastes full bodied but with minimal Creamer and Minimal Flavor concentrates due to the Location of the Flavoring process in the invention, thus enabling the preparation of a drink with Minimal Calories. The Nitrogen infuser shown is of the CURTIS brand model NB2 where the Infuser has 2 Nitrogen control Knobs (65) and (66) for increasing or decreasing the intensity of the Nitrogen infusion. In the Present invention this control knobs may be manipulated by the end user either through the Mobile App or on the Touch screen by adding Motors to each knob such as shown (67) and (68) which are controlled by the Microprocessor of the Kiosk and Computer. Since the flavoring in this invention is done at the end of the line it allows for a final water rinse during the preparatory cycle of the drink which will wash out the Manifold Cavity from any previous flavor thus eliminating from the system the need of additional rinse cycles and waist reservoirs, which otherwise may add expensive maintenance to the overall operation of the Kiosk. The Manifold flavoring system used is of low maintenance. Other Electronic Controlled Solenoid based Manifolds may be found in the art but will eventually clog due to the viscosity of the flavors.

Figure 12A:
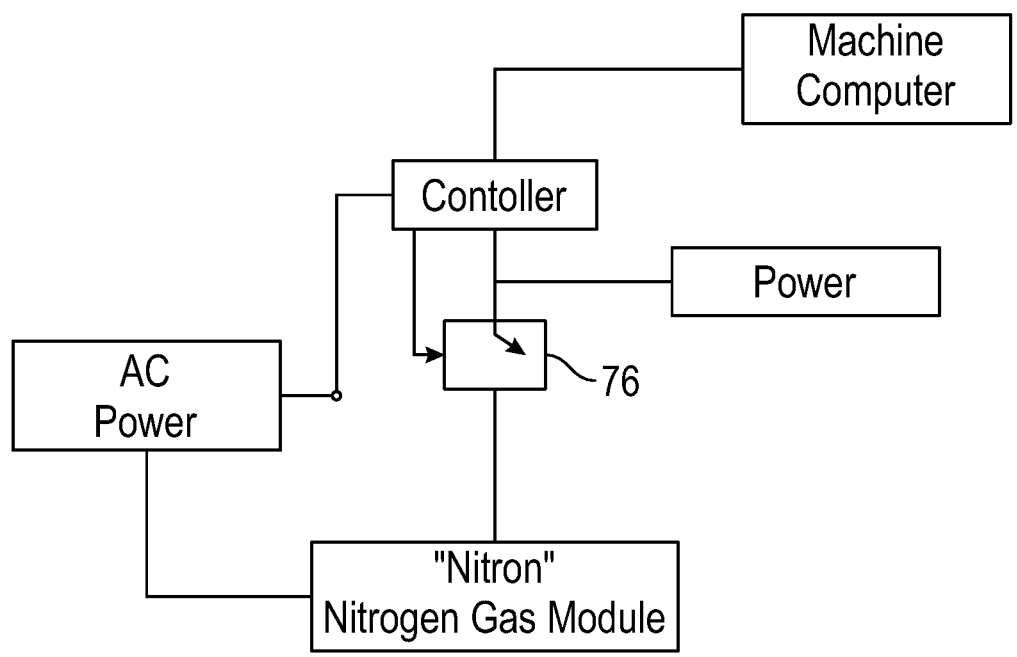
FIG. 12A provides a schematic diagram illustrating the power management of the invention with the Smart Relay control system for the "Nitron" Gas Module.

FIG. 12A The Nitro Brew Kiosk of the present invention is equipped with a Nitrogen Guarantee to the end user. The "Nitrogen Generator" is pluggable into the Nitro Brew Kiosk via a "smart Plug" (76) With reference to FIG. 12A, a series of relays are controlled by the Nitro Brew kiosk computer to manage power allocations among the components of the Kiosk. Relay (76) (a master Relay) is normally closed to provide the "Nitron" Gas Module with power at all times. The relay (76) and machine computer operate to constantly evaluate power draw, for example, by means of a hall-effect amperage sensor. Relay (76) "Smart Relay" has four configured parameters which may be manipulated based on the type of Nitrogen Producing Module and its amperage draw.

Maximum power consumption: In Case of the "BUNN" NITROGEN GAS MODULE hereinafter referred to as the "Nitrogen Generator" is set at 3 Amps. A draw above this level will result in shutting down the "Nitrogen Generator" and an error report will be wirelessly transmitted.

Minimum power consumption: (typically set at 0 Amps, because when the "Nitrogen Generator" is idle there is a minimal to none power Draw.

Operating Power Consumption: Every Time the "Nitrogen Generator" starts its operating based on Demand by the Kiosk the amperage sensor at relay (76) (Master) detects the Amperage Draw and compares it to a predetermined amperage level programmed into the Microprocessor of the Invention.

In the case of the "Bunn" NITROGEN GAS MODULE 1.2 Amperes.

In the Present Invention The master relay (76) and/or machine computer is preferably equipped with a Watchdog program that monitors for anomalous operating conditions.

The Watch Dog feature of relay (76) will monitor the duration of the amperage draw. If the Amperage Draw of 1.2 Amps exceeded a predetermined duration let's say exceeding 30 Seconds, this signifies that there is some type of Nitrogen Leakage in the system. In turn The Microprocessor of the Kiosk will Turn Off Relay (76) (Master) preventing harm which may be caused to the "Nitrogen Generator" due to prolonged operation. The Status of Relay (76) will be reported via Wi-Fi to the main server. And the Kiosk of the present invention will be out of service.

In a different scenario if the "Nitrogen Generator" Fails to start during a Beverage dispensing Cycle and Amperage Draw of Relay (76) during entire cycle was bellow 1.2 Amps in the amount of the Operating Current Hysteresis predetermined value, let's say 0.5 Amps. (1.2 Amps×0.5 Amps=0.7 Amps) This incident will immediately be reported to the Kiosk Microprocessor, which will void the transaction and turn the machine to out of service.

Operating current hysteresis: This Parameter represents the difference between kick start amperage and running amperage at a lowest level consumption. For example if the kick amperage is 1.7 Amps and running levels are 1.2 Amps, than the hysteresis will be 0.5 Amps.

Figure 12B:
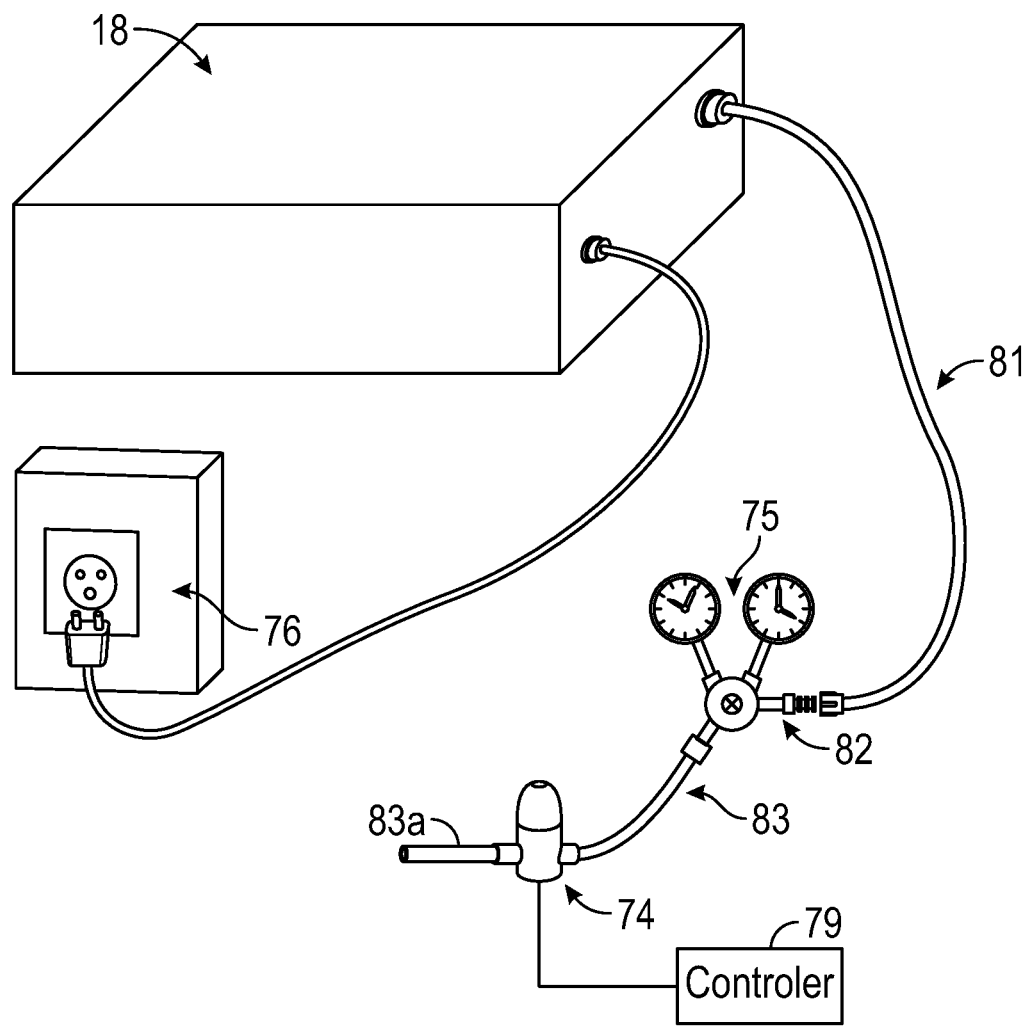
FIG. 12B illustrates The conversation kit which makes the Nitron Gas Module an integral Component of the Invention FIG. 13 Provides a Schematic diagram illustrating the power management of the invention with the smart relay system and DC power alternative in case of Grid Power failure.

FIG. 12B Illustrates The conversation kit which makes the NITRON GAS MODULE manufactured by Bunn Corporation here in referred to as the "Nitrogen Generator" as an integral Component of the Invention. The NITRON GAS MODULE (18) generates, per manufacturer default setting, a Nitrogen Gas pressure of 120 PSI. This elevated PSI rating is not useful in the present invention due to a Lower PSI demand by the available Nitrogen Beverage Infusers by way of example CURTIS a Nitro Beverage Infuser Manufactured by Wilbur Curtis Co which only works with a regulated 50 PSI of Nitrogen Gas or the MININIMV1 manufactured by Micro Matic Co. which requires a Maximum of 35 PSI of Nitrogen Gas. In this invention an ordinary Dual Stage Nitrogen Gas Regulator (75) was Modified to work between the Gas Line of the NITRON GAS MODULE producing 120 PSI and the Nitro Beverage Infusers requiring a Maximum of 35-50 PSI. Where (82) is a custom Coupling added to an off the shelf Nitrogen Gas Regulator. Where (83) is a 50 PSI Nitrogen Gas Line which is controlled through a Gas Solenoid (74) with the machine microprocessor (79). The "Nitrogen Generator" is monitored through the Machine smart Relay Box (76) further explained in (FIG. 12A.)

Figure 13:
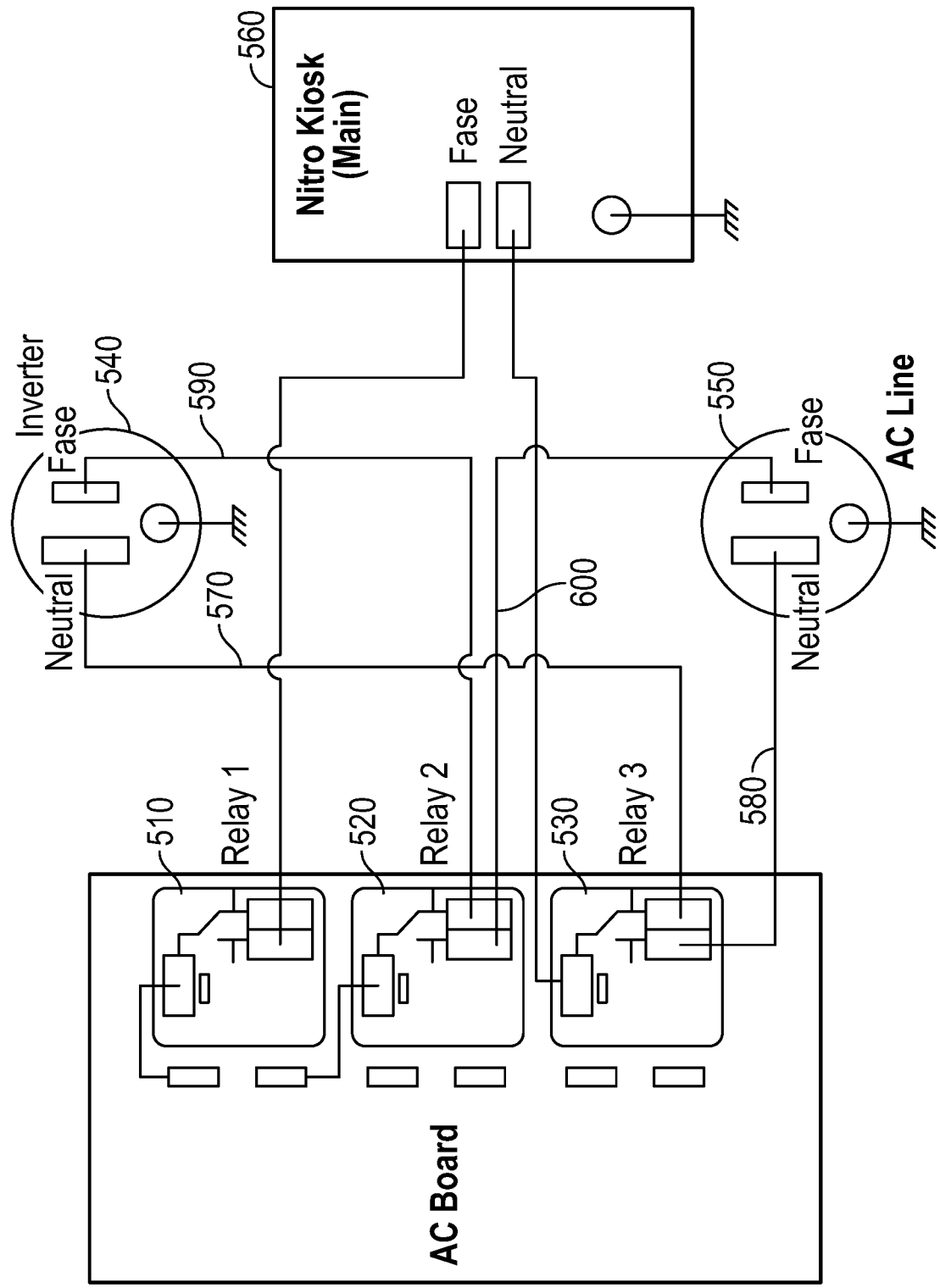

FIG. 13 The Nitro Kiosk of the present invention is designed to operate with or without grid power at times of major blackout events. The Kiosk is equipped with DC power which will run the entire Kiosk for a long duration of time off a Battery power back in excess of 200 Amp hours at 12 volts DC or 10 Hours at 120 AC output. The Kiosk is equipped with an Inverter & a quick Battery Charger which will fully charge the Battery Bank in less than an hour with a Power Grid Draw of only 4 Amps. An AC/DC Smart Relay (510) will constantly evaluate the presence of AC Power and at any given time will switch to DC Power within a 1000/second in case of electrical interruption preventing the Kiosk of the present invention from ever losing power. In FIG. 13 Smart Relay (510) constantly evaluates AC power Demand of the Nitro Kiosk (560), coming from Grid Power Line (550) for example, through a Hall effect Sensor, Relay (520) and Relay (530) are in active state, and when Grid AC power is down they will be in a non active state which will draw power through the Inverter (540) and the DC Power Battery Bank. Neutral (570) and Leg (590) coming out of the Inverter (540) or Neutral (580) and Leg (600) coming of the Grid (550) are routed through different relays for additional protection to the System.

Figure 14A:
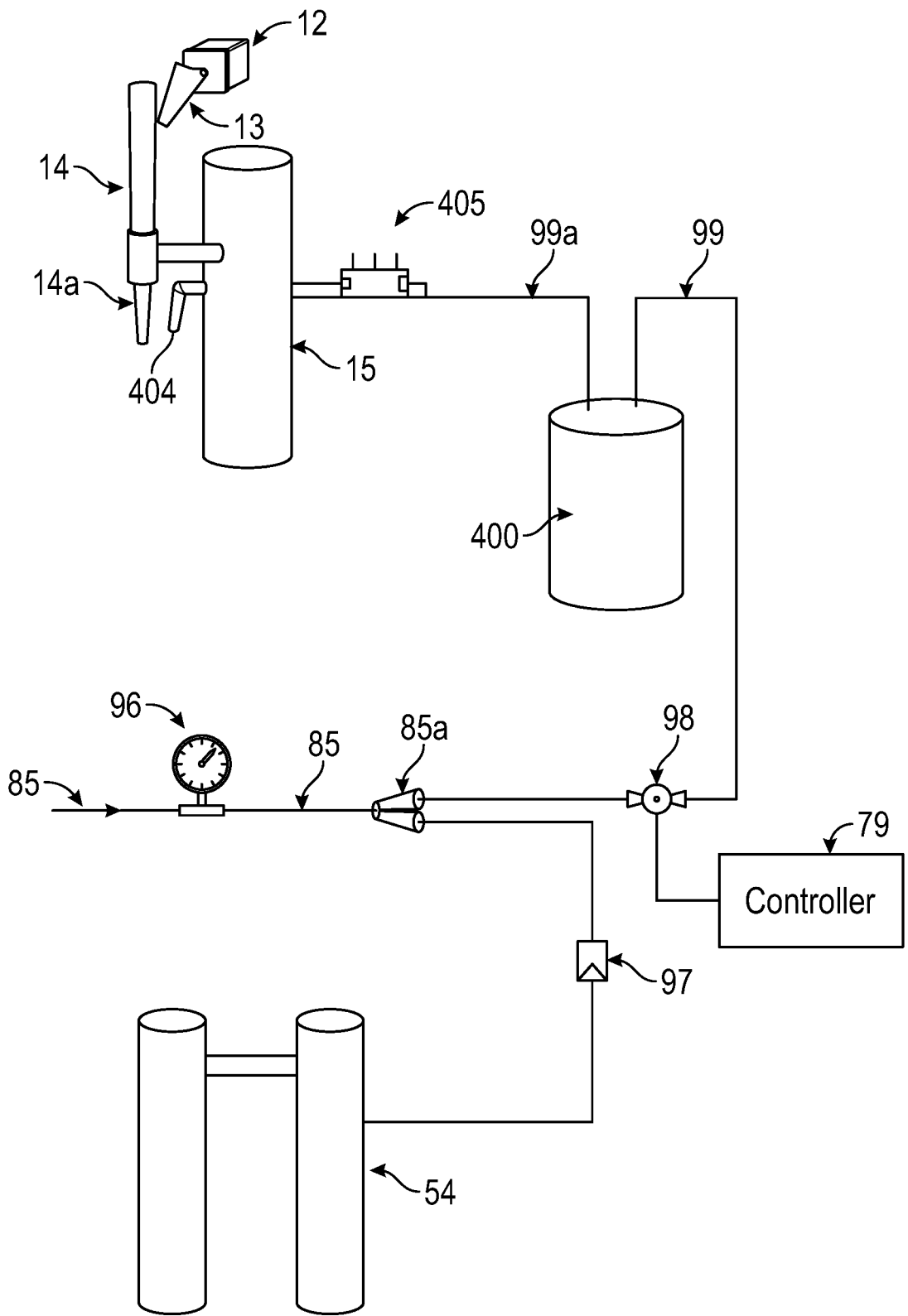
FIG. 14A provides a schematic diagram of FIG. 7 with the addition of a hot water dispensing system.

FIG. 14A provides a schematic diagram of the Invention with the addition of a Hot water dispensing system for the delivery of Hot Drinks in combination of Nitrogen infused froth to top the hot beverage. The hot system starts from Pressurized water line (85) with a split connector (85a) which directs the regulated water stream to the refrigerated Nitrous station explained in (FIG. 11A) to the chilling station (54) through one way valve (97) and the other side with an electric Solenoid gate (98) to the water heater and reservoir (400). Electric Solenoid (98) activated through the main controller (79) controls the water flow to the Hot Unit (400). Water is dispensed through an additional open Faucet (404) straight into a cup. The hot Beverage concentrates are dispensed from the Shelf stable Bag N Box concentrates through a Flavoring Manifold (405) via Peristaltic pumps Shown in (FIG. 1) (20) straight onto the empty Cup, while hot water is dispensed simultaneously through Manifold (405) as well at a regulated 50 PSI of water pressure thus mixing the beverage in the cup through the intensity of the water flow via a conical shaped water Faucet (404) which increases the water stream flow into the cup. The Hot beverage may be topped with a Nitrous Bag N Box Milk/Cream or Latte concentrate coming from the Refrigerated Nitrous station (77) through the Nitrous Faucet (14a), as the Linear Robotic Arm (1) shown in (FIG. 3) retracts backwards thus creating a hot frothy drink.

Figure 14B:
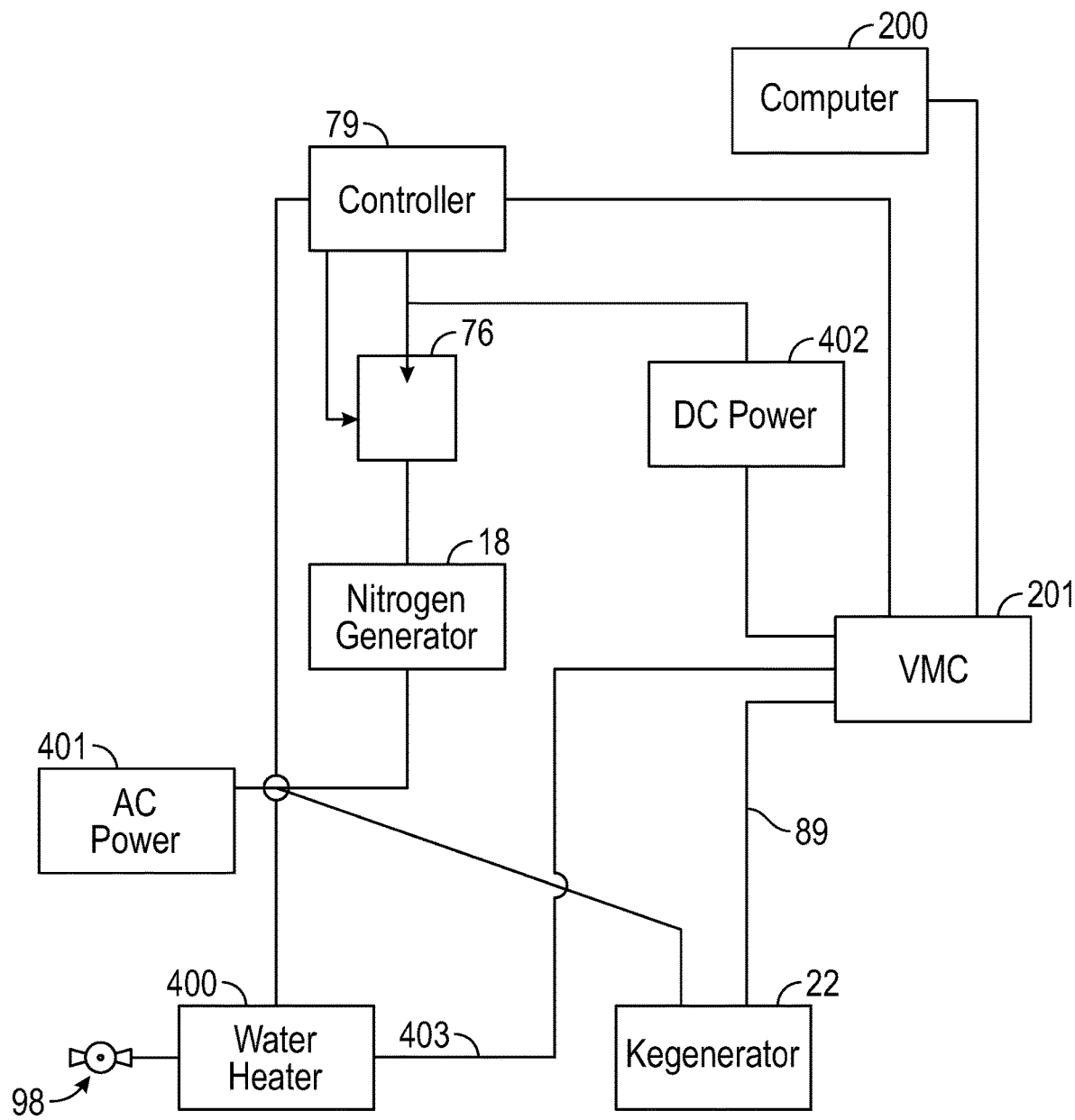
FIG. 14B illustrates a control command flow chart of a dual Cold/Hot Nitro kiosk.

FIG. 14B Illustrates a control command flow chart of the dual Cold/Hot preferred embodiment of the Nitro Kiosk. The Computer (200) which works with the Touch screen interface and Mobile App communicates an order through the VMC controller (201) which in turns communicates through RS485 to the Relay Controller (79) to turn on solenoid (98) for the dispense of hot water. The Hot Water unit (400) reports its temperature through a thermostatic probe (403) to the VMC controller (201) which in turn reports such temperature to the Computer (200) which communicates to a dedicated server for monitoring the machine. The Kegerator (22) reports its internal refrigerated temperature to the VMC controller (201) through probe (89). If temperature exceed or are under a preset value predetermined the Kiosk may turn off its payment system and report such incident to the main server. The "Nitrogen Generator" (18) is controlled by "Smart Relay" (76) with a monitoring Watch Dog explained in (FIG. 12A). AC power (401) is monitored as illustrated in (FIG. 13).

FIG. 15 illustrates a schematic diagram of a UVC control Card (24) for emitting a disinfecting UVC light onto the Cup delivery Tray and a smart Relay control system. The UVC LED has a very high power of (6 watts) and an ideal wavelength (260-270 nm) to guarantee the surface disinfection process. The UVC Light is controlled by the Kiosks Computer (200) & microprocessor (201) as well as with a Smart Relay (202) which also analysis the UVC light amperage draw and the that the device is properly working, since the UVC LED hits up very fast and may cause harm if not properly controlled.

FIG. 16 provides a Frontal View of the Automated Nitro Kiosk main Door (300). A QR reader (302) located in a housing (301) facing downward scans a QR code on the customer's phone after purchase was completed and initiates the Nitro Drink Cycle. A window display (303) appears on the Touch Screen (308) which assists the customer to properly align his phone with the scanner. A QR symbol (304) of the virtual store appears on the Screen and allows the customer to scan it and is directed to the Nitro Store, thus making the Nitro Vending Kiosk totally touch free. Along Side the QR reader (301) is a convenient open slot (305) for retrieval of a Lid dispensed by the automatic Lid Dispenser during the Nitro Drink Cycle. The final product Delivery opening (307) and Door is situated on the lower left side of the large viewing window (306) for a visual experience while machine operates.

Figure 17:
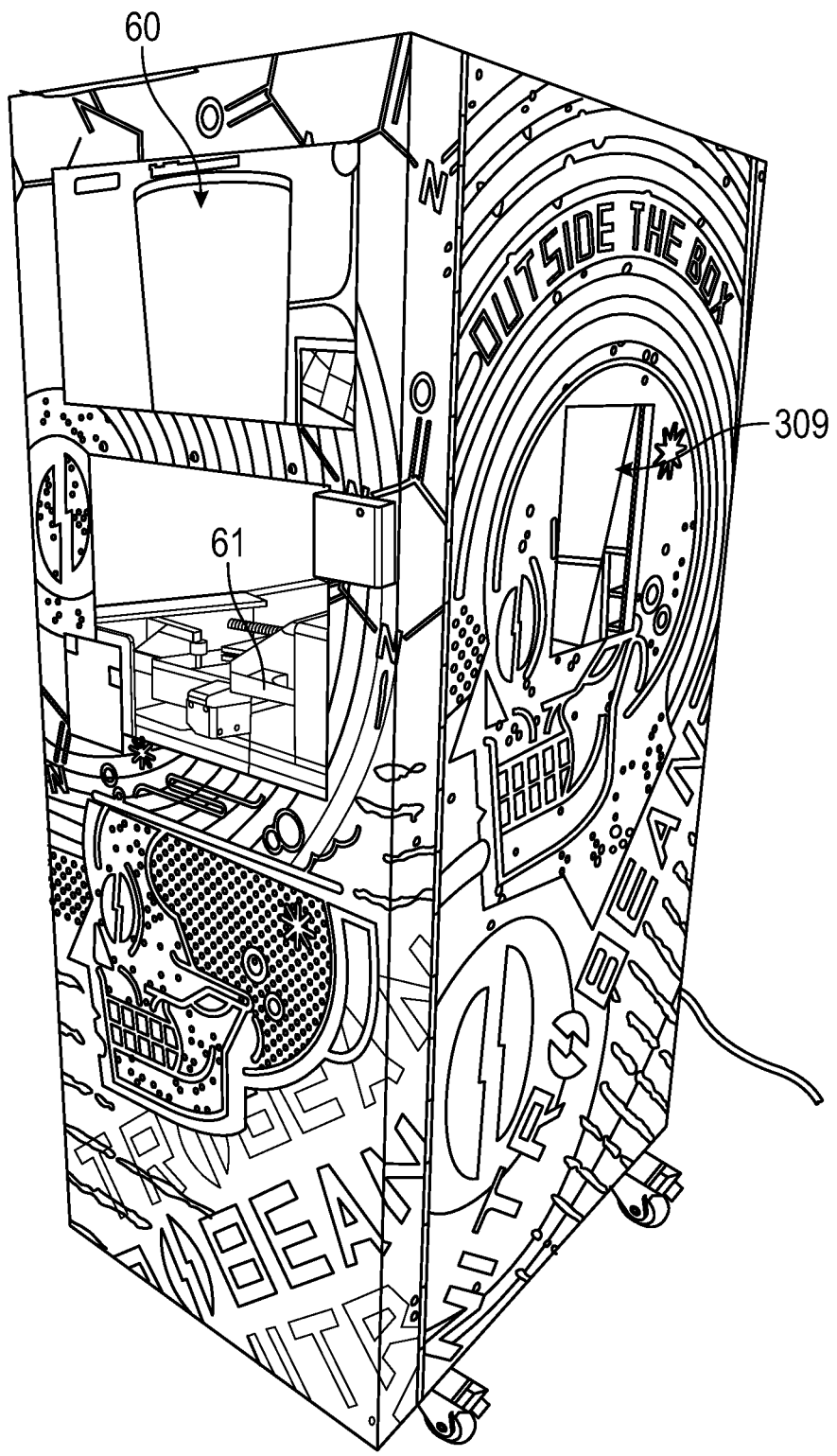
FIG. 17 provides a Perspective outside view of the right side of the Nitro Robotic Kiosk, showing a front viewing window as well as a side viewing window.

FIG. 17 Provides a Perspective outside view of the right side of the Nitro Robotic Kiosk, showing a front viewing window (306) as well as a side viewing window (309).

Figure 18:
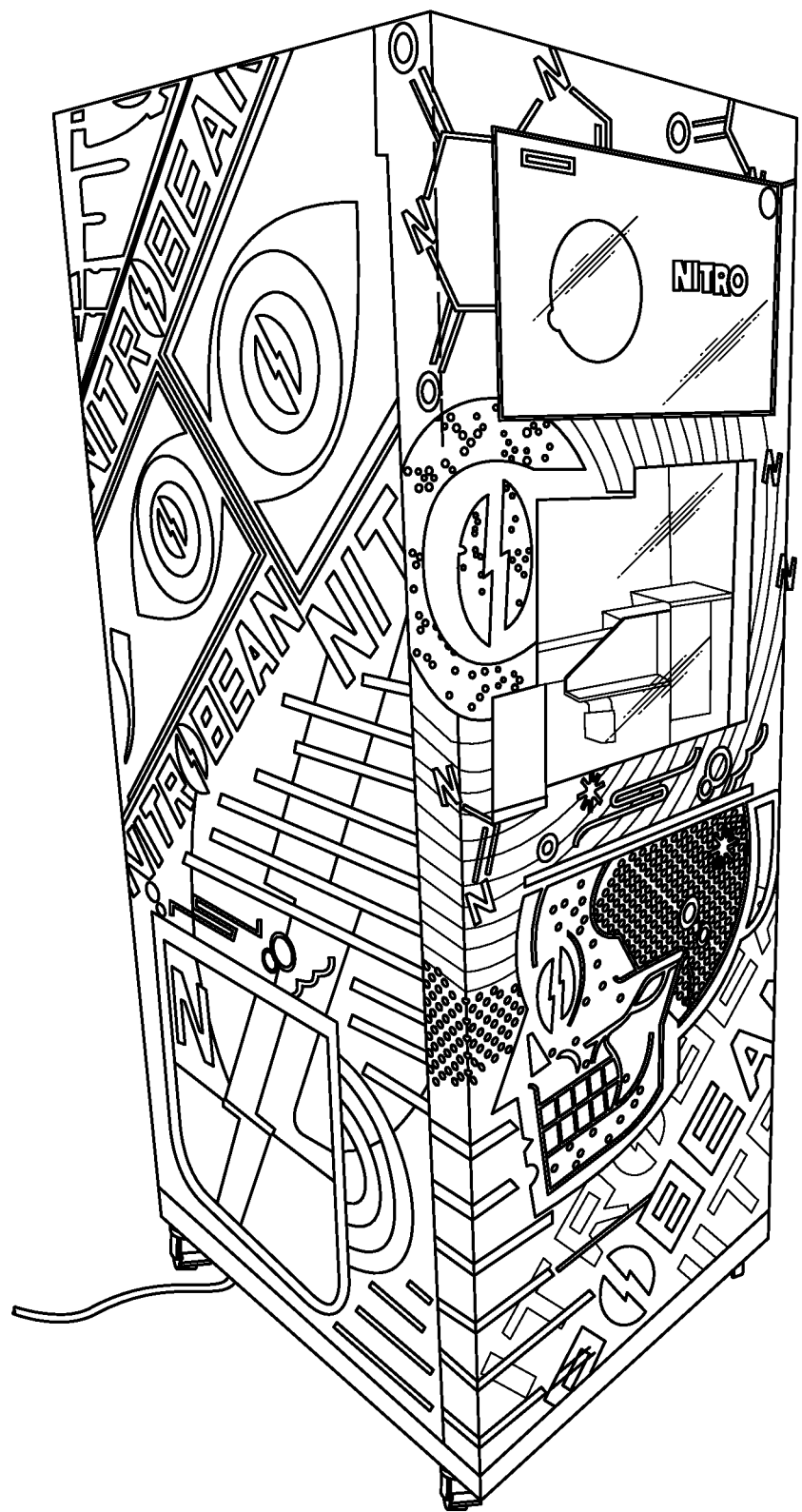
FIG. 18 provides a perspective outside view of the left side of the Nitro Robotic Kiosk.

FIG. 18 provides a perspective outside view of the left side of the Nitro Robotic Kiosk.

Figure 19:
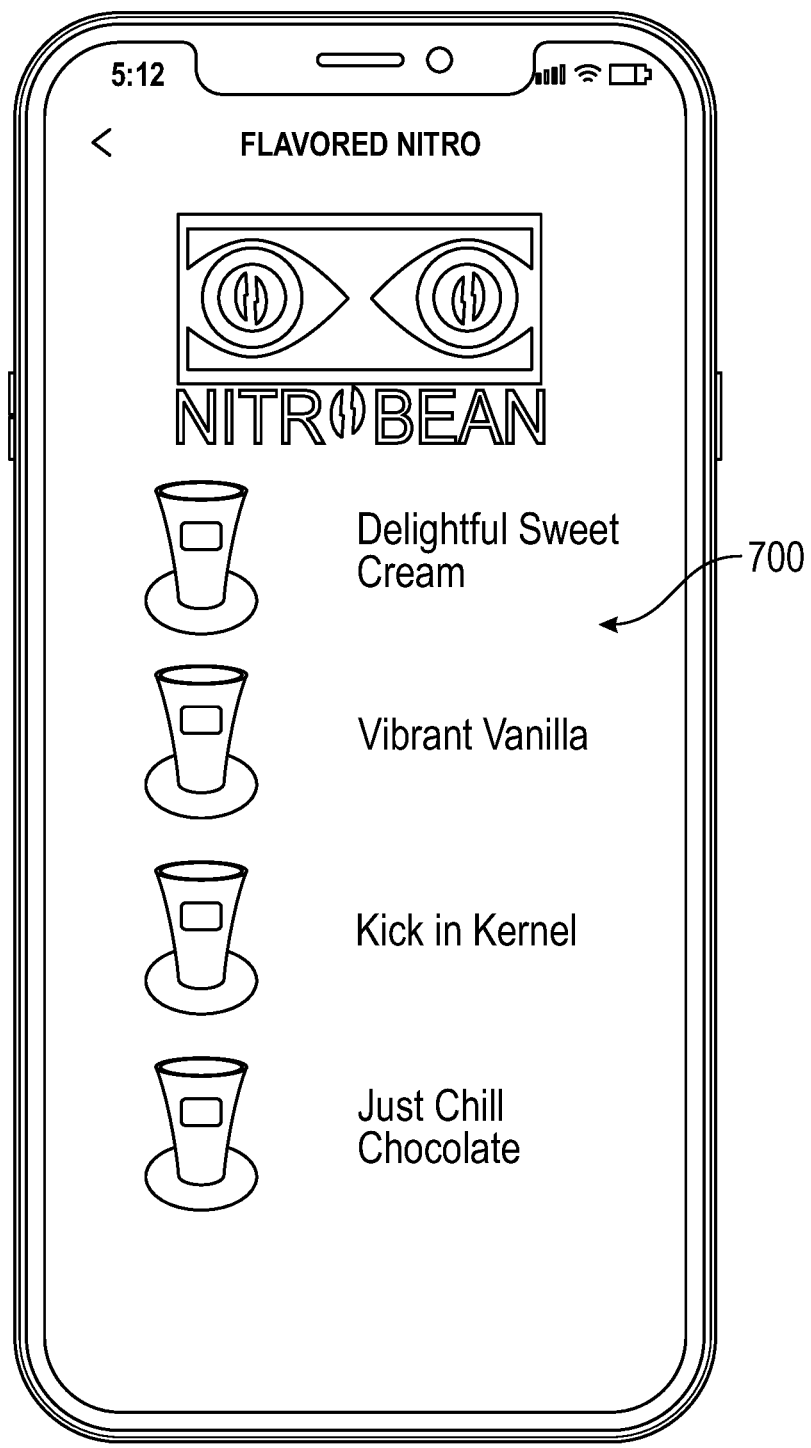
FIG. 19 illustrates the menu page of the phone App interface with the Kiosk. (Ability to choose different flavor levels, and double shot on the Nitro Coffee.)

FIG. 19 illustrates the menu page (700) of the phone App interface with the Kiosk with all possible selections. The Menu page on the Phone app is identical to the one on the Touch screen of the Kiosk enabling the customer to make his selection from either one.

Figure 20:
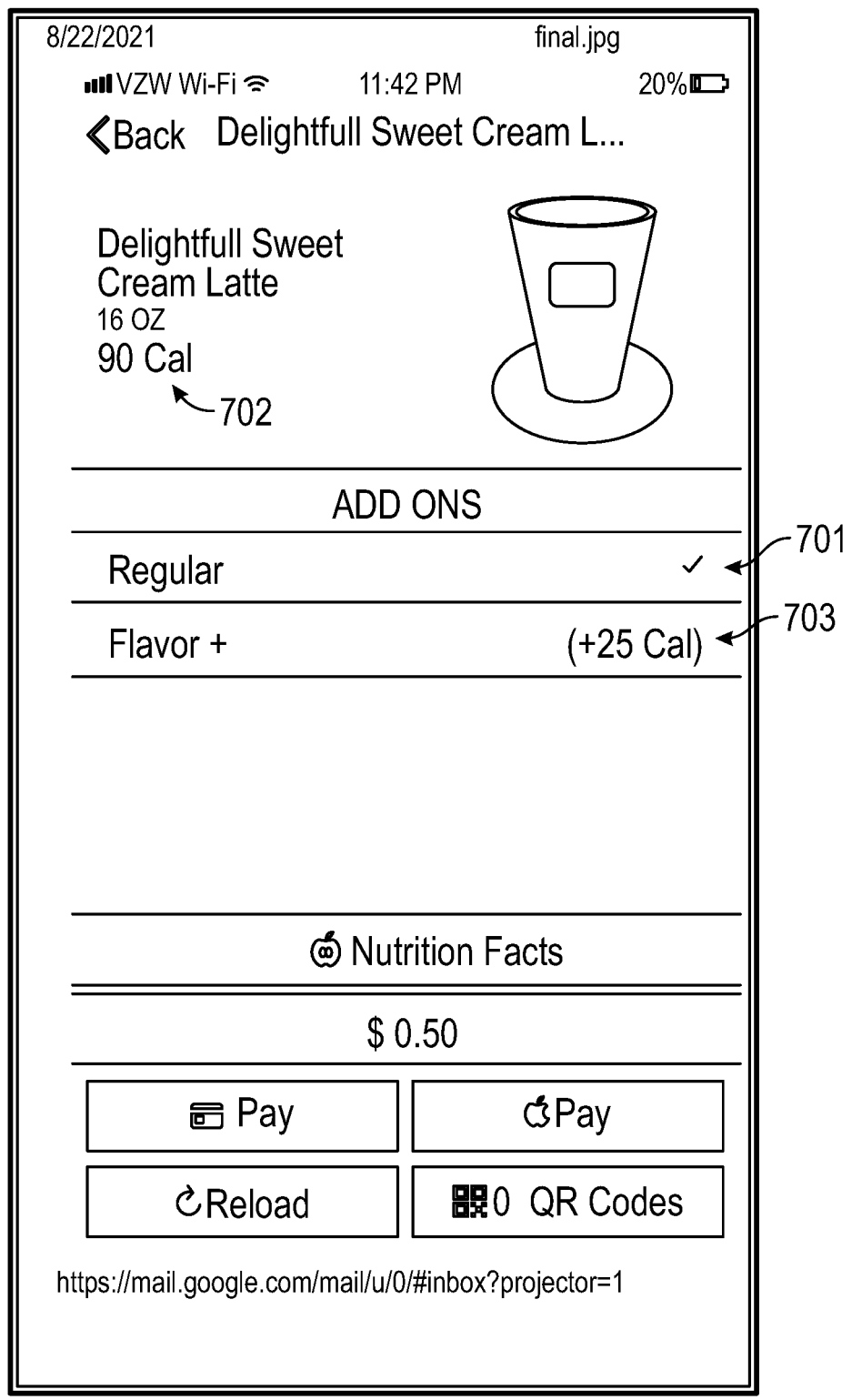
FIG. 20 illustrates a selection page of the phone App interface with the Kiosk, where customer is able to select an extra flavor and pay. (Ability to choose different flavor levels, and double shot on the Nitro Coffee.)

FIG. 20 illustrates a selection page of the phone App interface with the Kiosk, where customer is able to make his selection of a preset Drink (701) & at the same time see the Calorie count (702). An additional toggle is available for extra boost of flavor (703), which if selected will add the proper flavor value to the preset drink selection add the proper calorie calculation, as well as a price increment. This system enables the customer to choose different flavor levels, as well as a double shot on the Nitro Coffee and immediately see the Calorie and price increment, where in other systems such information is located in hidden charts at back of the App.

Figure 21:
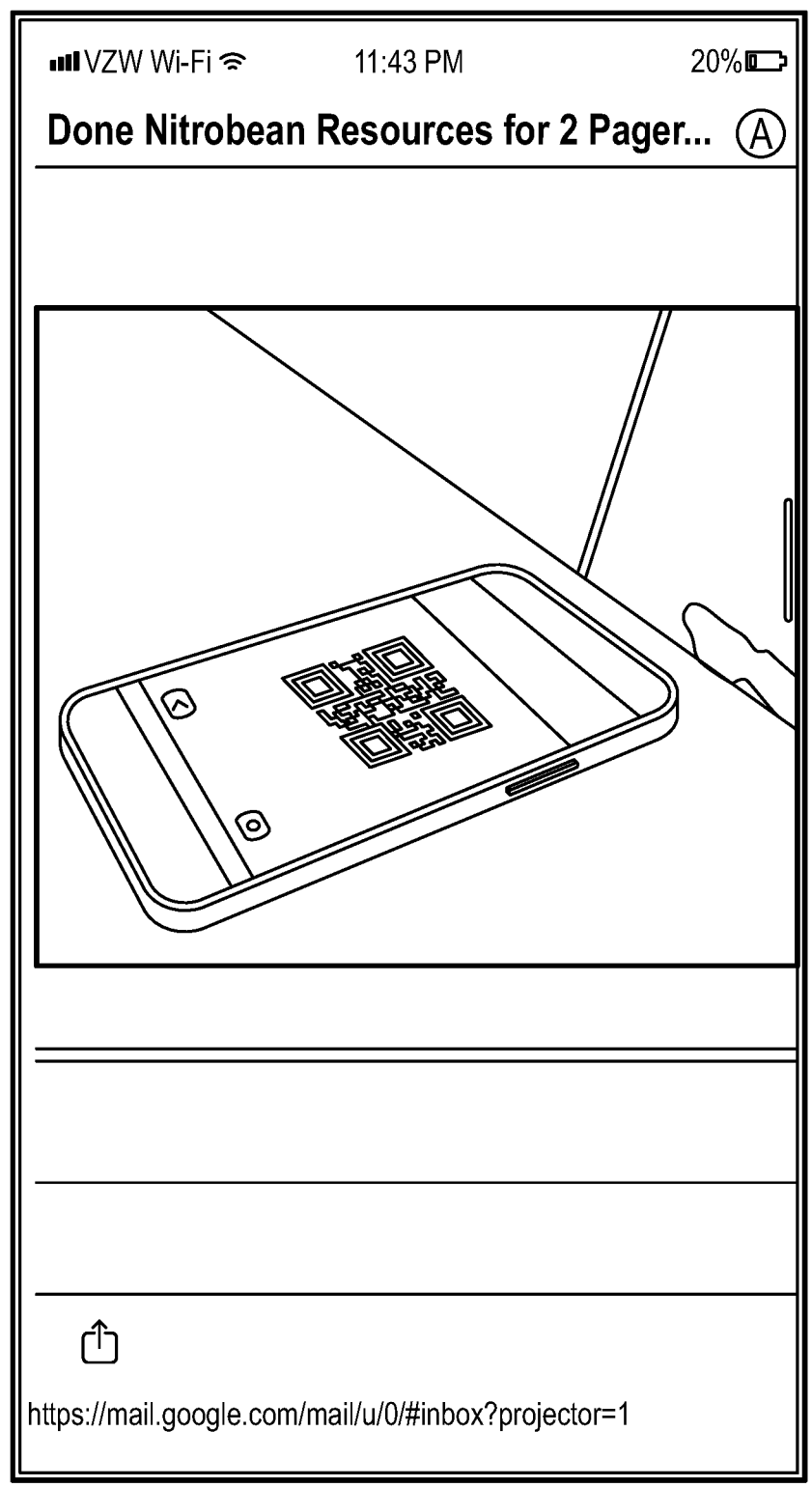
FIG. 21 illustrates a QR presentation to the Nitro Kiosk for the initiation of a product preparation.

FIG. 21 Illustrates a QR presentation to the Nitro Kiosk for the initiation of a product preparation.

REF NO. FEATURE OF ELEMENT

1. Linear Arm
2. Travel Bracket
3. Cup Cradle
4. Ultrasonic Sensor
5. Pivoting Pulley system
6. Vertical Actuator
7. Delivery Tray
   7*a*. Delivery Tray Protective wall
   7*b*. Wiper Arm Extension
   7*c*. Wiper Linear Track
   7*d*. Delivery Tray Linear track
8. Ultrasonic Sensor
9. Wiper Mechanism
10. Wiper Blade
11. Cup Dispenser
12. Stepper Motor
    12*a*. Actuator
13. Lever Pusher
14. Nitro Handle
    14*a*. Slow Flow Faucet
15. Nitro Tower
16. Shelf (For ambient Bag N Box Storage)
17. 80/20 Frame
18. "Nitron" Nitrogen Generator
    18*a*. Nitron Fastener Bracket
19. Flavor Bag N Box
    19*a*. Flavor line
20. Flavor Peristaltic Pump
21. Drip Tray Liquid Sensor
    21*a*. Drip Tray
22. Kegerator
23. Protective Panel
24. UVC LED
25. Cups
26. Inner Door Frame
27. Touch Screen
28. Protective Panel
29. Internal Camera
30. Delivery Door
31. Delivery Door Protector
32. Delivery Door Stepper Motor
33. Waist Bin
34. Actuator Lock
35. Locking Rod
36. Mini Computer
37. Lid Stacker
38. Motorized Lid Tray
39. Linear Track for lid retrieval
40. Lid Dispenser
41. Limit Sensor (Lid Detector)
42. Suction hose
43. Suction Cup
44. 180 Degree Lid Transporter
45. Motor & Timing Pulley
46. Mini DC Suction pump
47. Lid Pusher lever
48. Extended Framing arm (Delivery Door Support)
49. Water Inlet
50. Water Pressure regulator
51. 3 stage water filter
52. water pressure pump
53. Mini accumulator tank
54. Water chilling station
    54*a* Chiller one
    54*b* chiller two
55. 3 way coupling
56. 56*a* One way Valve
    56*b* One Way Valve
57. 57*a*. Electric Solenoid
    57*b*. Electric solenoid 58. High power peristaltic pump
59. High power peristaltic pump
60. Bag N Box Coffee concentrate
61. Bag N Box Creamer concentrate
62. One Way Valve coffee
63. One way valve creamer
64. Beverage Nitro Infuser
65. Nitro Control knob
66. Nitro control knob
67. Motor assembly
68. Motor assembly
69. One way Valve Coffee line
70. One Way Creamer Line
71. Multi Flavor manifold
72. One way Valve Flavor
73. 3 way Coupler
74. Electric Solenoid Nitrogen
75. Nitrogen Modified Regulator
   75a. High Side N2
   75b. Low Side Regulated N2
   75C. N2 Regulator
76. "Nitron" Watchdog Smart Relay
77. Refrigerated area
78. Motor Control Microprocessor
79. N2 Solenoid Micro Processor
80. "Nitron" Plug
81. "Nitron" N2 Line (120 PSI)
82. Custom Adopter for N2 Regulator
83. Regulated N2 Line reduced to (50 PSI)
   83a. N2 Line controlled by Microprocessor.
84. Filtered water line Low PSI
85. Pressurized water elevated to (50 PSI)
   85a. 2 Way Coupling
86. Flavor Hose Sleeve (A)
87. Flavor hose sleeve (B)
88. Ambient Thermostat Probe
89. Refrigeration Thermostat Probe
90. Water PSI Gage
91. Regulated Water Line going to Filter
92. Back of Kegerator
93. Lower Back Door
94. Hollow Stainless water transfer Tube
95. Union Tube
96. Pressurized water PSI Gage
97. One Way Valve
98. Electronic Solenoid Gate for Hot Water
99. Water line to Hot Water reservoir
   99a Hot Water Line
100. Large Drip Tray
101. Cup/Container Cradle
102. Ultrasonic Sensor
103. Internal Linear Track
104. Upper compartment for Flavor Bag N Box
105. Upper Compartment gull wing door
106. Touch Screen (semi automatic kiosk)
107. QR Reader (Semi automatic Kiosk)
108. Back Framing
109. Shelf for Nitrogen Generator
110. Back Plate For water system
111. Plexiglas protective cover
112. Opening
113. Fasteners
114. External Automatic Cup Dispenser
200. Computer
201. VMC Controller
202. UVC Smart Relay
300. Machine Door
301. QR Reader Housing
302. QR Reader
303. QR. Reader Display on Touch screen
304. QR Symbol on Touch Screen
305. Lid Retrieval Slot
306. Large Viewing Window
307. Delivery Opening
308. Touch screen
309. Side Viewing Window
400. Water Heater & Reservoir
401. Ac power Source
402. DC Power Source
403. Hot Water Thermostatic Probe
404. Hot Water Dispense Nozzle
405. Flavoring Manifold For Hot Station
510. AC/DC Smart Relay
520. AC Active Relay 1
530. AC Active Relay 2
540. Inverter Power
550. Grid Power
560. Nitro Kiosk Main
Ref. No. Feature of element
570. Neutral of Inverter
580. Neutral of Grid
590. Leg of Inverter
600. Leg of Grid
700. Phone App Menu
701. Preset Drink Selection
702. Calorie accumulator
703. Toggle for additional flavor

I claim:

1. A system for preparing and dispensing a nitrogen-infused beverage, comprising
a chilled water delivery subsystem;
a beverage concentrate bag-in-box (BiB) subsystem including at least one beverage concentrate BiB fluidically coupled to at least one beverage pump;
a nitrogen delivery subsystem;
a nitrogen infuser having a first input fluidically coupled to the nitrogen delivery subsystem and at least one other input fluidically coupled to the at least one beverage pump;
a flavor concentrate BiB subsystem including at least one flavor concentrate BiB fluidically coupled to at least one flavor pump;
a kegerator tower assembly;
a flavor manifold having a first input fluidically coupled to an output of the nitrogen infuser, at least one other input to the at least one flavor pump, and an output fluidically coupled to an input of the kegerator tower assembly;
a controller configured for controlling the at least one beverage pump and the at least one flavor pump; and
a computer coupled to camera, the computer configured for instructing the controller to prepare the beverage,
wherein an output of the chilled water delivery subsystem is fluidically coupled to a fluid line interposed between the at least one beverage pump and the at least one other input of the nitrogen infuser, the fluid line providing fluidic coupling between the at least one beverage pump and the at least one other input of the nitrogen infuser,
wherein the system is operable to provide a mixture of chilled water from the chilled water delivery system and beverage concentrate from the at least one beverage concentrate BiB to the at least one other input of the nitrogen infuser by operation of the at least one beverage pump wherein the nitrogen infuser is operable to infuse nitrogen provided by the nitrogen delivery with the mixture of chilled water and beverage concentrate;

wherein the flavor manifold is operable to mix flavor concentrate from the at least one flavor concentrate BiB into nitrogen-infused mixture of chilled water and beverage concentrate by operation of the at least one flavor pump, and to provide the flavored, nitrogen-infused mixture of chilled water and beverage concentrate from an output of the nitrogen infuser to the input of the kegerator tower assembly, and wherein the kegerator tower assembly is operable to dispense the flavored, nitrogen-infused mixture of chilled water and beverage concentrate as a beverage, and wherein the at least one other input of the nitrogen infuser is fluidically coupled to a solenoid controllable to allow or prevent fluid flow into the at least one other input.

2. The system of claim 1, wherein the chilled water delivery subsystem comprises:
a regulator configured to be fluidically coupled to a commercial water line;
a filter subsystem having an input fluidically coupled to the regulator;
a water pump having an input fluidically coupled to an output of the filter subsystem;
an accumulator having an input fluidically coupled to an output of the water pump;
a water chiller having an input fluidically coupled to an output of the accumulator, and having an output fluidically coupled to the fluid line interposed between the at least one beverage pump and the at least one other input of the nitrogen infuser.

3. The system of claim 2, wherein the system further comprises a kegerator refrigeration compartment, and the water chiller is positioned within the kegerator refrigeration compartment.

4. The system of claim 2, wherein the water chiller comprises a pair of fluidically coupled chilling cylinders.

5. The system of claim 1, wherein the nitrogen delivery subsystem comprises a nitrogen generator fluidically coupled to an input of a regulator, the regulator having an output fluidically coupled to the first input of the nitrogen infuser.

6. The system of claim 1, further comprising a dispenser control subsystem configured for operating a tap handle of the kegerator tower assembly.

7. The system of claim 1, wherein the first input and at least one other input of the flavor manifold are each fluidically coupled to a check valve, the check valve for preventing fluid flow from the first input and the at least one other input.

8. The system of claim 1, wherein the output of the nitrogen infuser is fluidically coupled to a check valve, the check valve for preventing fluid flow back into the output.

9. The system of claim 1, wherein the output of the chilled water delivery system is fluidically coupled to a check valve, the check valve for preventing fluid flow back into the output.

10. A system for preparing and dispensing a nitrogen-infused beverage, comprising
a chilled water delivery subsystem;
a beverage concentrate bag-in-box (BiB) subsystem including at least one beverage concentrate BiB fluidically coupled to at least one beverage pump;
a nitrogen delivery subsystem;
a nitrogen infuser having a first input fluidically coupled to the nitrogen delivery subsystem and at least one other input fluidically coupled to the at least one beverage pump;
a flavor concentrate BiB subsystem including at least one flavor concentrate BiB fluidically coupled to at least one flavor pump;
a kegerator tower assembly;
a flavor manifold having a first input fluidically coupled to an output of the nitrogen infuser, at least one other input to the at least one flavor pump, and an output fluidically coupled to an input of the kegerator tower assembly;
a controller configured for controlling the at least one beverage pump and the at least one flavor pump; and
a computer coupled to camera, the computer configured for instructing the controller to prepare the beverage,
wherein an output of the chilled water delivery subsystem is fluidically coupled to a fluid line interposed between the at least one beverage pump and the at least one other input of the nitrogen infuser, the fluid line providing fluidic coupling between the at least one beverage pump and the at least one other input of the nitrogen infuser,
wherein the system is operable to provide a mixture of chilled water from the chilled water delivery system and beverage concentrate from the at least one beverage concentrate BiB to the at least one other input of the nitrogen infuser by operation of the at least one beverage pump
wherein the nitrogen infuser is operable to infuse nitrogen provided by the nitrogen delivery with the mixture of chilled water and beverage concentrate;
wherein the flavor manifold is operable to mix flavor concentrate from the at least one flavor concentrate BiB into nitrogen-infused mixture of chilled water and beverage concentrate by operation of the at least one flavor pump, and to provide the flavored, nitrogen-infused mixture of chilled water and beverage concentrate from an output of the nitrogen infuser to the input of the kegerator tower assembly, and wherein the kegerator tower assembly is operable to dispense the flavored, nitrogen-infused mixture of chilled water and beverage concentrate as a beverage; and
the system further comprises a creamer BiB subsystem fluidically coupled to an additional input of the nitrogen infuser by a creamer pump.

11. The system of claim 10, wherein the output of the chilled water delivery subsystem is fluidically coupled to another fluid line interposed between the creamer pump and the additional input of the nitrogen infuser, the fluid line providing fluidic coupling between the creamer pump and the additional input and the nitrogen infuser operable to provide a mixture of chilled water from the chilled water delivery system and creamer concentrate from the at least one creamer concentrate BiB.

12. The system of claim 11, wherein the nitrogen infuser further comprises a second output configured for providing the mixture of chilled water from the chilled water delivery system and creamer concentrate to a fluid line interposed between the output of the flavor manifold and the input of the kegerator tower assembly.

13. The system of claim 1, further comprising a delivery tray assembly having:
- a delivery tray;
- a motor and linear transport for advancing and retracting the delivery tray;
- a wiper assembly configured to contact and clean a delivery surface of the delivery tray when retracting;
- and a UVC germicidal lamp assembly configured to radiate over the delivery surface of the delivery tray.

14. The system of claim 1, further comprising a Kegerator Tap Handle push Mechanism assembly having:
- a lever Pusher; and
- a motor or actuator for advancing and retracting the Lever Pusher.

* * * * *